US012799237B2

(12) United States Patent
Coustham et al.

(10) Patent No.: US 12,799,237 B2
(45) Date of Patent: Nov. 17, 2026

(54) METALLOCENE CATALYST AND USE THEREOF

(71) Applicants: TOTALENERGIES ONETECH BELGIUM, Seneffe (BE); UNIVERSITE DE RENNES, Rennes (FR); CENTRE NATIONAL DE LA RECHERCHE SCIENTIFIQUE, Paris (FR)

(72) Inventors: Thomas Coustham, Seneffe (BE); Jean-François Carpentier, Rennes Cedex (FR); Evgueni Kirillov, Rennes Cedex (FR); Dimitra Theodosopoulou, Rennes (FR); Alexandre Welle, Seneffe (BE); Lorenzo Piola, Seneffe (BE)

(73) Assignees: TOTALENERGIES ONETECH BELGIUM, Seneffe (BE); UNIVERSITE DE RENNES, Seneffe (BE); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 494 days.

(21) Appl. No.: 18/286,383

(22) PCT Filed: May 24, 2022

(86) PCT No.: PCT/EP2022/064136

§ 371 (c)(1),
(2) Date: Oct. 11, 2023

(87) PCT Pub. No.: WO2022/248517

PCT Pub. Date: Dec. 1, 2022

(65) Prior Publication Data

US 2024/0209127 A1 Jun. 27, 2024

(30) Foreign Application Priority Data

May 27, 2021 (EP) .................................... 21305704

(51) Int. Cl.
*C08F 4/76* (2006.01)
*C08F 2/06* (2006.01)
*C08F 210/06* (2006.01)

(52) U.S. Cl.
CPC .................. *C08F 4/76* (2013.01); *C08F 2/06* (2013.01); *C08F 210/06* (2013.01)

(58) Field of Classification Search
CPC ........... B01J 31/1608; C08F 4/76; C08F 2/06; C08F 210/06
(Continued)

(56) References Cited

U.S. PATENT DOCUMENTS

2020/0123290 A1 4/2020 Park et al.
2021/0230319 A1* 7/2021 Ajellal .................... C08F 10/06

FOREIGN PATENT DOCUMENTS

CN 104870461 A 8/2015
CN 108884184 A 11/2018
(Continued)

OTHER PUBLICATIONS

Japanese Office Action Issued On Oct. 14, 2025 With Respect to Counterpart Japanese Patent Application No. 2023-573152, And Its English Transation.
International Search Report and Written Opinion mailed on Jul. 13, 2022, issued in PCT International Patent Application No. PCT/EP2022/064136.
English Language Translation of Chinese Office Action Issued on Aug. 16, 2025 With Respect to Counterpart Chinese Patent Application No. 202280037394.0.
Korean Office Action Issued on Jun. 25, 2025 With Respect to Counterpart Korean Patent Application No. 10-2023-7044206, 19 pages.

*Primary Examiner* — Patricia L. Hailey
(74) *Attorney, Agent, or Firm* — Amster, Rothstein & Ebenstein LLP

(57) ABSTRACT

The present invention relates to a catalyst of Formula (I) wherein $R^2$, $R^3$, $R^4$, $R^5$, $R^6$, $R^7$, $R^8$, $R^9$, $R^{10}$, $R^{11}$, $L^1$, $M^1$, $Q^1$ and $Q^2$ have the meaning defined in the description and claims. The present invention also relates to a catalyst composition comprising at least one catalyst according to the invention, an optional activator; an optional support; and an optional co-catalyst. The present invention also relates to the use of a catalyst or catalyst composition according to the invention for the preparation of an olefin polymer. The present invention also relates to an olefin polymerization process, the process comprising: contacting a catalyst or a catalyst composition according to the invention, with an olefin monomer, optionally hydrogen, and optionally one or more olefin comonomers; polymerizing the monomer, and the optionally one or more olefin comonomers, in the presence of the at least one catalyst composition, and optional hydrogen, thereby obtaining an olefin polymer. The present invention also relates to olefin polymers and articles comprising said olefin polymer.

(I)

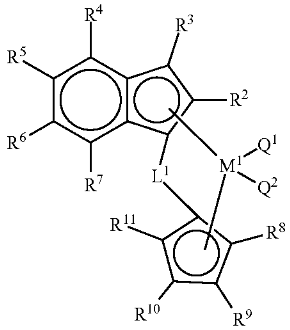

16 Claims, No Drawings

(58) Field of Classification Search
USPC .................................................. 502/103, 150
See application file for complete search history.

(56) References Cited

FOREIGN PATENT DOCUMENTS

| | | | |
|---|---|---|---|
| EP | 3 418 311 | A1 | 12/2018 |
| JP | H07-224079 | A | 8/1995 |
| JP | 2003231714 | A | 8/2003 |
| JP | 2009533382 | A | 9/2009 |
| JP | 2016172714 | A | 9/2016 |
| KR | 1020200056283 | | 5/2020 |
| WO | 2014096164 | A1 | 6/2014 |

* cited by examiner

METALLOCENE CATALYST AND USE THEREOF

CROSS-REFERENCE TO RELATED APPLICATIONS

This application is a U.S. national stage entry under 35 U.S.C. § 371 of PCT International Patent Application No. PCT/EP2022/064136, filed May 24, 2022, which claims priority to European Patent Application No. 21305704.5, filed May 27, 2021, the contents of each of which are incorporated herein by reference in their entirety.

FIELD OF INVENTION

The invention relates to new metallocene catalysts. The invention also relates to the use of the new metallocene catalysts in polymerization reactions. The invention also relates to polyolefins obtained using the new metallocene catalysts, and articles made therefrom.

BACKGROUND OF THE INVENTION

Metallocene catalysts have been used to manufacture polyolefins for many years. Countless academic and patent publications describe the use of these catalysts in olefin polymerization. Although a lot of work has been done in the field of metallocene catalysts, there still remain some problems, which relate mainly to the productivity or activity of the catalysts.

Metallocene catalysts have some advantages such as good organoleptics and optics and some particularity like a narrow distribution. However, high melting temperature or low melt flow rate polypropylene are not always easily produced using these catalysts.

Many metallocene structures were synthetized, some of them enabled the production of low melt flow rate or high melting temperature polypropylene but at the detriment of other parameters such as a low activity.

Thus, there is room for improving the catalyst behavior. Thus, it is desired to find catalyst systems, which provide high and stable activity and, in addition to the other properties mentioned above, also broad molecular weight range or higher degrees of crystallinity of the final product.

SUMMARY OF THE INVENTION

It is therefore an object of the present invention to provide a new catalyst avoiding the above-mentioned drawbacks.

In a first aspect, the present invention provides a metallocene catalyst of Formula (I), wherein (I)

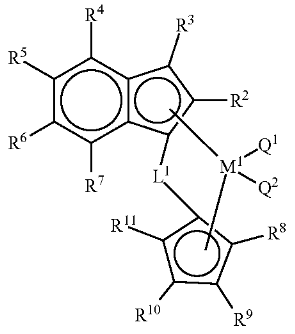

$R^2$, $R^3$, $R^4$, $R^5$, $R^6$, $R^7$, are each independently selected from hydrogen or a group comprising alkyl, alkenyl, cycloalkyl, cycloalkenyl, cycloalkenylalkyl, aryl, —$OR^{15}$, alkylaryl, arylalkyl, halogen, $Si(R^{12})_3$, and heteroalkyl; wherein each of said group can be unsubstituted or substituted with one or more substituents $Z^1$; wherein $Z^1$ is selected from —$OR^{16}$, alkyl, and alkenyl; wherein $R^{15}$, $R^{16}$ are each independently selected from the group comprising alkyl, arylalkyl, alkylaryl and aryl; preferably $R^{15}$, $R^{16}$ are each independently alkyl; and wherein at least one of $R^3$, $R^4$, $R^5$, $R^6$, $R^7$ is —$OR^{15}$;

$R^8$, $R^9$, $R^{10}$, $R^{11}$, are each independently selected from the group comprising hydrogen, alkyl, alkenyl, cycloalkyl, cycloalkenyl, cycloalkenylalkyl, aryl, alkoxy, alkylaryl, arylalkyl, halogen, $Si(R^{12})_3$, and heteroalkyl;

$L^1$ is $SiR^{13}R^{14}$, —$[CR^{13}R^{14}]_h$—, $GeR^{13}R^{14}$, or $BR^{13}$; wherein h is an integer selected from 1, 2, or 3; each of $R^{13}$, and $R^{14}$ are independently selected from the group comprising hydrogen, alkyl, alkenyl, cycloalkyl, cycloalkenyl, cycloalkenylalkyl, aryl, aminoalkyl, and arylalkyl; or $R^{13}$ and $R^{14}$ together with the atom to which they are attached form a cycloalkyl, cycloalkenyl or heterocyclyl;

$M^1$ is a transition metal selected from the group comprising zirconium, titanium, hafnium, and vanadium; and preferably M is zirconium;

$Q^1$ and $Q^2$ are each independently selected from the group comprising halogen, alkyl, —$N(R^{17})_2$, alkoxy, cycloalkoxy, aryloxy, arylalkyloxy, cycloalkyl, aryl, alkylaryl, aralkyl, and heteroalkyl; wherein each $R^{17}$ is independently selected from the group comprising hydrogen, alkyl, $Si(R^{12})_3$, cycloalkyl, aryl, alkylaryl, aralkyl, and heteroalkyl; and each $R^{12}$ is independently hydrogen, alkyl, or alkenyl.

In a second aspect, the present invention provides a catalyst composition comprising a catalyst according to the first aspect of the invention, an optional activator; an optional support; and an optional co-catalyst.

In a third aspect, the present invention provides an olefin polymerization process, the process comprising: contacting at least one catalyst according to the first aspect, or a catalyst composition according to the second aspect, with an olefin monomer, optionally hydrogen, and optionally one or more olefin comonomers; and polymerizing the monomer, and the optionally one or more olefin comonomers, in the presence of the at least one catalyst or catalyst composition, and optional hydrogen, thereby obtaining an olefin polymer.

In a fourth aspect, the present invention provides, an olefin polymer at least partially catalyzed by at least one catalyst according to the first aspect or at least one catalyst composition according to the second aspect or produced by the process according to the third aspect of the invention.

The present invention also encompasses an article comprising the olefin polymer according to the fourth aspect.

The independent and dependent claims set out particular and preferred features of the invention. Features from the dependent claims may be combined with features of the independent or other dependent claims as appropriate.

The present invention will now be further described. In the following passages, different aspects of the invention are defined in more detail. Each aspect so defined may be combined with any other aspect or aspects unless clearly indicated to the contrary. In particular, any feature or statement indicated as being preferred or advantageous may be combined with any other features or statements indicated as being preferred or advantageous.

DETAILED DESCRIPTION OF THE INVENTION

Before the present compositions, catalysts, compounds, processes, articles, and uses encompassed by the invention are described, it is to be understood that this invention is not limited to particular compositions, catalysts, compounds, processes, articles, and uses described, as such compositions, catalysts, compounds, processes, articles, and uses may, of course, vary. It is also to be understood that the terminology used herein is not intended to be limiting, since the scope of the present invention will be limited only by the appended claims.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention. When describing the compounds, processes, articles, and uses of the invention, the terms used are to be construed in accordance with the following definitions, unless the context dictates otherwise.

As used herein, the singular forms “a”, “an”, and “the” include both singular and plural referents unless the context clearly dictates otherwise. By way of example, “a resin” means one resin or more than one resin.

The terms “comprising”, “comprises” and “comprised of” as used herein are synonymous with “including”, “includes” or “containing”, “contains”, and are inclusive or open-ended and do not exclude additional, non-recited members, elements or method steps. The terms “comprising”, “comprises” and “comprised of” also include the term “consisting of”.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

Reference throughout this specification to “one embodiment” or “an embodiment” means that a particular feature, structure or characteristic described in connection with the embodiment is included in at least one embodiment of the present invention. Thus, appearances of the phrases “in one embodiment” or “in an embodiment” in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims and statements, any of the embodiments can be used in any combination.

Whenever the term “substituted” is used herein, it is meant to indicate that one or more hydrogen atoms on the atom indicated in the expression using “substituted” is replaced with a selection from the indicated group, provided that the indicated atom’s normal valence is not exceeded, and that the substitution results in a chemically stable compound, i.e. a compound that is sufficiently robust to survive isolation from a reaction mixture. Preferred substituents for the indenyl, cyclopentadienyl and fluorenyl groups, can be selected from the group comprising alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl. Preferably, each indenyl is substituted with at least one aryl or heteroaryl, more preferably aryl; preferably wherein the aryl or heteroaryl substituent is on the 3-position on each indenyl; the indenyl can be further substituted with one or more substituents selected from the group comprising alkyl, alkenyl, cycloalkyl, aryl, alkoxy, alkylaryl, arylalkyl, halogen, $Si(R^{10})_3$, heteroalkyl; wherein each $R^{10}$ is independently hydrogen, alkyl, or alkenyl.

The term “halo” or “halogen” as a group or part of a group is generic for fluoro, chloro, bromo, iodo.

The term “alkyl” as a group or part of a group, refers to a hydrocarbyl group of formula $C_nH_{2n+1}$ wherein n is a number greater than or equal to 1. Alkyl groups may be linear or branched and may be substituted as indicated herein. Generally, alkyl groups of this invention comprise from 1 to 20 carbon atoms, preferably from 1 to 10 carbon atoms, preferably from 1 to 6 carbon atoms, more preferably from 1 to 4 carbon atoms. When a subscript is used herein following a carbon atom, the subscript refers to the number of carbon atoms that the named group may contain. For example, the term “$C_{1-20}$alkyl”, as a group or part of a group, refers to a hydrocarbyl group of formula $—C_nH_{2n+1}$ wherein n is a number ranging from 1 to 20. Thus, for example, “$C_{1-8}$alkyl” includes all linear or branched alkyl groups with between 1 and 8 carbon atoms, and thus includes methyl, ethyl, n-propyl, i-propyl, butyl and its isomers (e.g. n-butyl, i-butyl and t-butyl); pentyl and its isomers, hexyl and its isomers, etc. A “substituted alkyl” refers to an alkyl group substituted with one or more substituent(s) (for example 1 to 3 substituent(s), for example 1, 2, or 3 substituent(s)) at any available point of attachment.

When the suffix “ene” is used in conjunction with an alkyl group, i.e. “alkylene”, this is intended to mean the alkyl group as defined herein having two single bonds as points of attachment to other groups. As used herein, the term “alkylene” also referred as “alkanediyl”, by itself or as part of another substituent, refers to alkyl groups that are divalent, i.e., with two single bonds for attachment to two other groups. Alkylene groups may be linear or branched and may be substituted as indicated herein. Non-limiting examples of alkylene groups include methylene ($—CH_2—$), ethylene ($—CH_2—CH_2—$), methylmethylene ($—CH(CH_3)—$), 1-methyl-ethylene ($—CH(CH_3)—CH_2—$), n-propylene ($—CH_2—CH_2—CH_2—$), 2-methylpropylene ($—CH_2—CH(CH_3)—CH_2—$), 3-methylpropylene ($—CH_2—CH_2—CH(CH_3)—$), n-butylene ($—CH_2—CH_2—CH_2—CH_2—$), 2-methylbutylene ($—CH_2—CH(CH_3)—CH_2—CH_2—$), 4-methylbutylene ($-CH_2-CH_2-CH_2-CH(CH_3)-$), pentylene and its chain isomers, hexylene and its chain isomers.

The term "alkenyl" as a group or part of a group, refers to an unsaturated hydrocarbyl group, which may be linear, or branched, comprising one or more carbon-carbon double bonds. Generally, alkenyl groups of this invention comprise from 3 to 20 carbon atoms, preferably from 3 to 10 carbon atoms, preferably from 3 to 8 carbon atoms. When a subscript is used herein following a carbon atom, the subscript refers to the number of carbon atoms that the named group may contain. Examples of $C_{3-20}$alkenyl groups are ethenyl, 2-propenyl, 2-butenyl, 3-butenyl, 2-pentenyl and its isomers, 2-hexenyl and its isomers, 2,4-pentadienyl, and the like.

The term "alkoxy" or "alkyloxy", as a group or part of a group, refers to a group having the formula $-OR^b$ wherein $R^b$ is alkyl as defined herein above. Non-limiting examples of suitable alkoxy include methoxy, ethoxy, propoxy, isopropoxy, butoxy, isobutoxy, sec-butoxy, tert-butoxy, pentyloxy and hexyloxy.

The term "cycloalkyl", as a group or part of a group, refers to a cyclic alkyl group, that is a monovalent, saturated, hydrocarbyl group having 1 or more cyclic structure, and comprising from 3 to 20 carbon atoms, more preferably from 3 to 10 carbon atoms, more preferably from 3 to 8 carbon atoms; more preferably from 3 to 6 carbon atoms. Cycloalkyl includes all saturated hydrocarbon groups containing 1 or more rings, including monocyclic, bicyclic groups or tricyclic. The further rings of multi-ring cycloalkyls may be either fused, bridged and/or joined through one or more spiro atoms. When a subscript is used herein following a carbon atom, the subscript refers to the number of carbon atoms that the named group may contain. For example, the term "$C_{3-20}$cycloalkyl", a cyclic alkyl group comprising from 3 to 20 carbon atoms. For example, the term "$C_{3-10}$cycloalkyl", a cyclic alkyl group comprising from 3 to 10 carbon atoms. For example, the term "$C_{3-8}$cycloalkyl", a cyclic alkyl group comprising from 3 to 8 carbon atoms. For example, the term "$C_{3-6}$cycloalkyl", a cyclic alkyl group comprising from 3 to 6 carbon atoms. Examples of $C_{3-12}$cycloalkyl groups include but are not limited to adamantly, cyclopropyl, cyclobutyl, cyclopentyl, cyclohexyl, cycloheptyl, cyclooctyl, bicycle[2.2.1]heptan-2yl, (1S,4R)-norbornan-2-yl, (1R,4R)-norbornan-2-yl, (1S,4S)-norbornan-2-yl, (1R,4S)-norbornan-2-yl.

When the suffix "ene" is used in conjunction with a cycloalkyl group, i.e. cycloalkylene, this is intended to mean the cycloalkyl group as defined herein having two single bonds as points of attachment to other groups. Non-limiting examples of "cycloalkylene" include 1,2-cyclopropylene, 1,1-cyclopropylene, 1,1-cyclobutylene, 1,2-cyclobutylene, 1,3-cyclopentylene, 1,1-cyclopentylene, and 1,4-cyclohexylene.

Where an alkylene or cycloalkylene group is present, connectivity to the molecular structure of which it forms part may be through a common carbon atom or different carbon atom. To illustrate this applying the asterisk nomenclature of this invention, a $C_3$alkylene group may be for example $*-CH_2CH_2CH_2-*$, $*-CH(-CH_2CH_3)-*$ or $*-CH_2CH(-CH_3)-*$. Likewise, a $C_3$cycloalkylene group may be

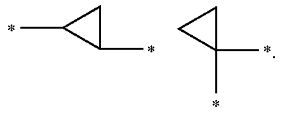

The term "cycloalkenyl" as a group or part of a group, refers to a non-aromatic cyclic alkenyl group, with at least one site (usually 1 to 3, preferably 1) of unsaturation, namely a carbon-carbon, sp2 double bond; preferably having from 5 to 20 carbon atoms more preferably from 5 to 10 carbon atoms, more preferably from 5 to 8 carbon atoms, more preferably from 5 to 6 carbon atoms. Cycloalkenyl includes all unsaturated hydrocarbon groups containing 1 or more rings, including monocyclic, bicyclic or tricyclic groups. The further rings may be either fused, bridged and/or joined through one or more spiro atoms. When a subscript is used herein following a carbon atom, the subscript refers to the number of carbon atoms that the named group may contain. For example, the term "$C_{5-20}$cycloalkenyl", a cyclic alkenyl group comprising from 5 to 20 carbon atoms. For example, the term "$C_{5-10}$cycloalkenyl", a cyclic alkenyl group comprising from 5 to 10 carbon atoms. For example, the term "$C_{5-8}$cycloalkenyl", a cyclic alkenyl group comprising from 5 to 8 carbon atoms. For example, the term "$C_{5-6}$cycloalkyl", a cyclic alkenyl group comprising from 5 to 6 carbon atoms. Examples include but are not limited to: cyclopentenyl ($-C_5H_7$), cyclopentenylpropylene, methylcyclohexenylene and cyclohexenyl ($-C_6H_9$). The double bond may be in the cis or trans configuration.

The term "cycloalkenylalkyl", as a group or part of a group, means an alkyl as defined herein, wherein at least one hydrogen atom is replaced by at least one cycloalkenyl as defined herein.

The term "cycloalkoxy", as a group or part of a group, refers to a group having the formula $-OR^h$ wherein $R^h$ is cycloalkyl as defined herein above.

The term "aryl", as a group or part of a group, refers to a polyunsaturated, aromatic hydrocarbyl group having a single ring (i.e. phenyl) or multiple aromatic rings fused together (e.g. naphthyl), or linked covalently, typically containing 6 to 20 atoms; preferably 6 to 10, wherein at least one ring is aromatic. The aromatic ring may optionally include one to two additional rings (either cycloalkyl, heterocyclyl or heteroaryl) fused thereto. Examples of suitable aryl include $C_{6-20}$aryl, preferably $C_{6-10}$aryl, more preferably $C_{6-8}$aryl. Non-limiting examples of aryl comprise phenyl, biphenylyl, biphenylenyl, or 1- or 2-naphthalenyl; 1-, 2-, 3-, 4-, 5- or 6-tetralinyl (also known as 1,2,3,4-tetrahydronaphtalene); 1-, 2-, 3-, 4-, 5-, 6-, 7- or 8-azulenyl, 4-, 5-, 6 or 7-indenyl; 4- or 5-indanyl; 5-, 6-, 7- or 8-tetrahydronaphthyl; 1,2,3,4-tetrahydronaphthyl; and 1,4-dihydronaphthyl; 1-, 2-, 3-, 4- or 5-pyrenyl. A "substituted aryl" refers to an aryl group having one or more substituent(s) (for example 1, 2 or 3 substituent(s), or 1 to 2 substituent(s)), at any available point of attachment.

The term "aryloxy", as a group or part of a group, refers to a group having the formula $-OR^g$ wherein $R^g$ is aryl as defined herein above.

The term "arylalkyl", as a group or part of a group, means an alkyl as defined herein, wherein at least one hydrogen atom is replaced by at least one aryl as defined herein. Non-limiting examples of arylalkyl group include benzyl, phenethyl, dibenzylmethyl, methylphenylmethyl, 3-(2-naphthyl)-butyl, and the like.

The term "alkylaryl" as a group or part of a group, means an aryl as defined herein wherein at least one hydrogen atom is replaced by at least one alkyl as defined herein. Non-limiting example of alkylaryl group include p-$CH_3$—$R^g$—, wherein $R^g$ is aryl as defined herein above.

The term "arylalkyloxy" or "aralkoxy" as a group or part of a group, refers to a group having the formula —O—$R^a$—$R^g$ wherein $R^g$ is aryl, and $R^a$ is alkylene as defined herein above.

The term "heteroalkyl" as a group or part of a group, refers to an acyclic alkyl wherein one or more carbon atoms are replaced by at least one heteroatom selected from the group comprising O, Si, S, B, and P, with the proviso that said chain may not contain two adjacent heteroatoms. This means that one or more —$CH_3$ of said acyclic alkyl can be replaced by —OH for example and/or that one or more —$CR_2$— of said acyclic alkyl can be replaced by O, Si, S, B, and P.

The term "aminoalkyl" as a group or part of a group, refers to the group —$R^j$—$NR^kR^l$ wherein $R^j$ is alkylene, $R^k$ is hydrogen or alkyl as defined herein, and $R^l$ is hydrogen or alkyl as defined herein.

The term "heterocyclyl" as a group or part of a group, refers to non-aromatic, fully saturated or partially unsaturated cyclic groups (for example, 3 to 7 member monocyclic, 7 to 11 member bicyclic, or containing a total of 3 to 10 ring atoms) which have at least one heteroatom in at least one carbon atom-containing ring. Each ring of the heterocyclic group containing a heteroatom may have 1, 2, 3 or 4 heteroatoms selected from N, S, Si, Ge, where the nitrogen and sulfur heteroatoms may optionally be oxidized and the nitrogen heteroatoms may optionally be quaternized. The heterocyclic group may be attached at any heteroatom or carbon atom of the ring or ring system, where valence allows. The rings of multi-ring heterocycles may be fused, bridged and/or joined through one or more spiro atoms.

Non limiting exemplary heterocyclic groups include aziridinyl, oxiranyl, thiiranyl, piperidinyl, azetidinyl, 2-imidazolinyl, pyrazolidinyl imidazolidinyl, isoxazolinyl, oxazolidinyl, isoxazolidinyl, thiazolidinyl, isothiazolidinyl, piperidinyl, succinimidyl, 3H-indolyl, indolinyl, isoindolinyl, 2H-pyrrolyl, 1-pyrrolinyl, 2-pyrrolinyl, 3-pyrrolinyl, pyrrolidinyl, 4H-quinolizinyl, 2-oxopiperazinyl, piperazinyl, homopiperazinyl, 2-pyrazolinyl, 3-pyrazolinyl, tetrahydro-2H-pyranyl, 2H-pyranyl, 4H-pyranyl, 3,4-dihydro-2H-pyranyl, oxetanyl, thietanyl, 3-dioxolanyl, 1,4-dioxanyl, 2,5-dioxoimidazolidinyl, 2-oxopiperidinyl, 2-oxopyrrolodinyl, indolinyl, tetrahydropyranyl, tetrahydrofuranyl, tetrahydrothiophenyl, tetrahydroquinolinyl, tetrahydroisoquinolin-1-yl, tetrahydroisoquinolin-2-yl, tetrahydroisoquinolin-3-yl, tetrahydroisoquinolin-4-yl, thiomorpholin-4-yl, thiomorpholin-4-ylsulfoxide, thiomorpholin-4-ylsulfone, 1,3-dioxolanyl, 1,4-oxathianyl, 1,4-dithianyl, 1,3,5-trioxanyl, 1H-pyrrolizinyl, tetrahydro-1,1-dioxothiophenyl, N-formylpiperazinyl, and morpholin-4-yl.

Preferred statements (features) and embodiments of the compositions, catalyst, compounds, processes, polymers, articles, and uses of this invention are set herein below. Each statement and embodiment of the invention so defined may be combined with any other statement and/or embodiment, unless clearly indicated to the contrary. In particular, any feature indicated as being preferred or advantageous may be combined with any other features or statements indicated as being preferred or advantageous. Hereto, the present invention is in particular captured by any one or any combination of one or more of the below numbered statements and embodiments, with any other aspect and/or embodiment.

1. A metallocene catalyst of Formula (I), wherein

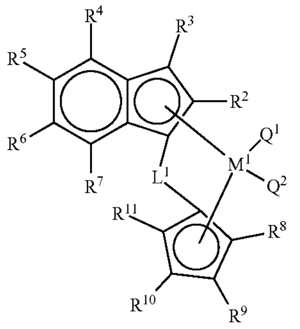

(I)

$R^2$, $R^3$, $R^4$, $R^5$, $R^6$, $R^7$, are each independently selected from hydrogen or a group comprising alkyl, alkenyl, cycloalkyl, cycloalkenyl, cycloalkenylalkyl, aryl, —$OR^{15}$, alkylaryl, arylalkyl, halogen, $Si(R^{12})_3$, and heteroalkyl; wherein each of said group can be unsubstituted or substituted with one or more substituents $Z^1$; wherein $Z^1$ is selected from —$OR^{16}$, alkyl, and alkenyl; wherein $R^{15}$, $R^{16}$ are each independently selected from the group comprising alkyl, arylalkyl, alkylaryl and aryl; preferably $R^{15}$, $R^{16}$ are each independently alkyl; and wherein at least one of $R^3$, $R^4$, $R^5$, $R^6$, $R^7$ is —$OR^{15}$;

$R^8$, $R^9$, $R^{10}$, $R^{11}$, are each independently selected from the group comprising hydrogen, alkyl, alkenyl, cycloalkyl, cycloalkenyl, cycloalkenylalkyl, aryl, alkoxy, alkylaryl, arylalkyl, halogen, $Si(R^{12})_3$, and heteroalkyl;

$L^1$ is $SiR^{13}R^{14}$, —$[CR^{13}R^{14}]_h$—, $GeR^{13}R^{14}$, or $BR^{13}$; wherein h is an integer selected from 1, 2, or 3; each of $R^{13}$, and $R^{14}$ are independently selected from the group comprising hydrogen, alkyl, alkenyl, cycloalkyl, cycloalkenyl, cycloalkenylalkyl, aryl, aminoalkyl, and arylalkyl; or $R^{13}$ and $R^{14}$ together with the atom to which they are attached form a cycloalkyl, cycloalkenyl or heterocyclyl;

$M^1$ is a transition metal selected from the group comprising zirconium, titanium, hafnium, and vanadium; and preferably M is zirconium;

$Q^1$ and $Q^2$ are each independently selected from the group comprising halogen, alkyl, —$N(R^{17})_2$, alkoxy, cycloalkoxy, aryloxy, arylalkyloxy, cycloalkyl, aryl, alkylaryl, aralkyl, and heteroalkyl; wherein each $R^{17}$ is independently selected from the group comprising hydrogen, alkyl, $Si(R^{12})_3$, cycloalkyl, aryl, alkylaryl, aralkyl, and heteroalkyl; and each $R^{12}$ is independently hydrogen, alkyl, or alkenyl.

2. The catalyst according to statement 1, wherein $R^2$, $R^3$, $R^4$, $R^5$, $R^6$, $R^7$, are each independently selected from hydrogen or a group comprising $C_{1-20}$alkyl, $C_{2-20}$alkenyl, $C_{3-20}$cycloalkyl, $C_{5-20}$cycloalkenyl, $C_{5-20}$cycloalkenyl$C_{1-20}$alkyl, $C_{6-20}$aryl, —$OR^{15}$, $C_{1-20}$alkyl$C_{6-20}$aryl, $C_{6-20}$aryl$C_{1-20}$alkyl, halogen, $Si(R^{12})_3$, and hetero$C_{1-12}$alkyl; wherein each of said group can be unsubstituted or substituted with one or more substituents $Z^1$; wherein $Z^1$ is selected from —$OR^{16}$, $C_{1-20}$alkyl, and $C_{2-20}$alkenyl; wherein $R^{15}$, $R^{16}$ are each independently selected from the group comprising $C_{1-20}$alkyl, $C_{6-20}$aryl$C_{1-20}$alkyl, $C_{1-20}$alkyl$C_{6-20}$aryl and $C_{6-20}$aryl; preferably $R^{15}$, $R^{16}$ are each independently $C_{1-20}$alkyl;

and wherein at least one of $R^3$, $R^4$, $R^5$, $R^6$, $R^7$ is —$OR^{15}$, $R^8$, $R^9$, $R^{10}$, $R^{11}$, are each independently selected from the group comprising hydrogen, $C_{1-20}$alkyl, $C_{2-20}$alkenyl, $C_{3-20}$cycloalkyl, $C_{5-20}$cycloalkenyl, $C_{5-20}$cycloalkenyl$C_{1-20}$alkyl, $C_{6-20}$aryl, $C_{1-20}$alkoxy, $C_{1-20}$alkyl$C_{6-20}$aryl, $C_{6-20}$aryl$C_{1-20}$alkyl, halogen, $Si(R^{12})_3$, and hetero$C_{1-12}$alkyl;

$L^1$ is $SiR^{13}R^{14}$, —$[CR^{13}R^{14}]_h$—, $GeR^{13}R^{14}$, or $BR^{13}$; wherein h is an integer selected from 1, 2, or 3; each of $R^{13}$, and $R^{14}$ are independently selected from the group comprising hydrogen, $C_{1-20}$alkyl, $C_{2-20}$alkenyl, $C_{3-20}$ cycloalkyl, $C_{5-20}$cycloalkenyl, $C_{5-20}$cycloalkenyl$C_{1-20}$alkyl, $C_{6-20}$aryl, amino$C_{1-20}$alkyl, and $C_{6-20}$aryl$C_{1-20}$alkyl; or $R^{13}$ and $R^{14}$ together with the atom to which they are attached form a $C_{3-20}$cycloalkyl, $C_{5-20}$cycloalkenyl or 3-14 membered heterocyclyl;

$M^1$ is a transition metal selected from the group comprising zirconium, titanium, hafnium, and vanadium; and preferably M is zirconium;

$Q^1$ and $Q^2$ are each independently selected from the group consisting of halogen, $C_{1-20}$alkyl, —$N(R^{17})_2$, $C_{1-20}$alkoxy, $C_{3-20}$cycloalkoxy, $C_{6-20}$aryl$C_{1-20}$alkyloxy, $C_{3-20}$cycloalkyl, $C_{6-20}$aryl, $C_{6-20}$aryloxy, $C_{1-20}$alkyl$C_{6-20}$aryl, $C_{6-20}$aryl$C_{1-20}$alkyl, and hetero$C_{1-20}$alkyl; wherein each $R^{17}$ is independently selected from the group comprising hydrogen, $C_{1-20}$alkyl, $Si(R^{12})_3$, $C_{3-20}$cycloalkyl, $C_{6-20}$aryl, $C_{1-20}$alkyl$C_{6-20}$aryl, $C_{6-20}$aryl$C_{1-20}$alkyl, and hetero$C_{1-20}$alkyl; preferably $Q^1$ and $Q^2$ are each independently selected from the group consisting of halogen, or $C_{1-20}$alkyl; and each $R^{12}$ is independently hydrogen, $C_{1-20}$alkyl, or $C_{2-20}$alkenyl.

3. The catalyst according to any one of statements 1-2, wherein $R^2$, $R^3$, $R^4$, $R^5$, $R^6$, $R^7$, are each independently selected from hydrogen or a group comprising $C_{1-8}$alkyl, $C_{2-8}$alkenyl, $C_{3-8}$cycloalkyl, $C_{5-8}$cycloalkenyl, $C_{5-8}$cycloalkenyl$C_{1-8}$alkyl, $C_{6-10}$aryl, —$OR^{15}$, $C_{1-8}$alkyl$C_{6-10}$aryl, $C_{6-10}$aryl$C_{1-8}$alkyl, halogen, $Si(R^{12})_3$, and hetero$C_{1-8}$alkyl; wherein each of said group can be unsubstituted or substituted with one or more substituents $Z^1$; wherein $Z^1$ is selected from —$OR^{16}$, $C_{1-8}$alkyl, and $C_{2-8}$alkenyl; each $R^{12}$ is independently hydrogen, $C_{1-8}$alkyl, or $C_{2-8}$alkenyl; wherein $R^{15}$, $R^{16}$ are each independently selected from the group comprising $C_{1-8}$alkyl, $C_{6-10}$aryl$C_{1-8}$alkyl, $C_{7-8}$alkyl$C_{6-10}$aryl and $C_{6-10}$aryl; preferably $R^{15}$, $R^{16}$ are each independently $C_{1-8}$alkyl; and wherein at least one of $R^3$, $R^4$, $R^5$, $R^6$, $R^7$ is —$OR^{15}$; preferably at least one of $R^4$, $R^5$, $R^6$, $R^7$ is —$OR^{15}$; preferably at least one of $R^4$, $R^5$, $R^6$ is —$OR^{15}$; preferably at least one of $R^4$, $R^5$, $R^6$ is —$OR^{15}$; preferably at least one of $R^5$, $R^6$, is —$OR^{15}$;

preferably $R^2$, $R^3$, $R^4$, $R^6$, $R^7$, are each independently selected from hydrogen or a group comprising $C_{1-8}$alkyl, $C_{2-8}$alkenyl, $C_{3-8}$cycloalkyl, $C_{5-8}$cycloalkenyl, $C_{5-8}$cycloalkenyl$C_{1-8}$alkyl, $C_{6-10}$aryl, —$OR^{15}$, $C_{1-8}$alkyl$C_{6-10}$aryl, $C_{6-10}$aryl$C_{1-8}$alkyl, halogen, $Si(R^{12})_3$, and hetero$C_{1-8}$alkyl; wherein each of said group can be unsubstituted or substituted with one or more substituents $Z^1$; wherein $Z^1$ is selected from —$OR^{16}$, $C_{1-8}$alkyl, and $C_{2-8}$alkenyl; each $R^{12}$ is independently hydrogen, $C_{1-8}$alkyl, or $C_{2-8}$alkenyl; wherein $R^{15}$, $R^{16}$ are each independently selected from the group comprising $C_{1-8}$alkyl, $C_{6-10}$aryl$C_{1-8}$alkyl, $C_{7-8}$alkyl$C_{6-10}$aryl and $C_{6-10}$aryl; preferably $R^{15}$, $R^{16}$ are each independently $C_{1-8}$alkyl; and $R^5$ is —$OR^{15}$;

preferably $R^2$, $R^3$, $R^6$, $R^7$, are each independently selected from hydrogen or a group comprising $C_{1-8}$alkyl, $C_{2-8}$alkenyl, $C_{3-8}$cycloalkyl, $C_{5-8}$cycloalkenyl, $C_{5-8}$cycloalkenyl$C_{1-8}$alkyl, $C_{6-10}$aryl, —$OR^{15}$, $C_{1-8}$alkyl$C_{6-10}$aryl, $C_{6-10}$aryl$C_{1-8}$alkyl, halogen, $Si(R^{12})_3$, and hetero$C_{1-8}$alkyl; wherein each of said group can be unsubstituted or substituted with one or more $Z^1$; wherein $Z^1$ is selected from —$OR^{16}$, $C_{1-8}$alkyl, and $C_{2-8}$alkenyl; each $R^{12}$ is independently hydrogen, $C_{1-8}$alkyl, or $C_{2-8}$alkenyl; wherein $R^{15}$, $R^{16}$ are each independently selected from the group comprising $C_{1-8}$alkyl, $C_{6-10}$aryl$C_{1-8}$alkyl, $C_{7-8}$alkyl$C_{6-10}$aryl and $C_{6-10}$aryl; preferably $R^{15}$, $R^{16}$ are each independently $C_{1-8}$alkyl; $R^4$ is $C_{6-10}$aryl wherein said $C_{6-10}$aryl can be unsubstituted or substituted with one or more substituents $Z^1$; and $R^5$ is —$OR^{15}$;

preferably $R^2$, $R^3$, $R^6$, $R^7$, are each independently selected from hydrogen or a group comprising $C_{1-8}$alkyl, $C_{2-8}$alkenyl, $C_{6-10}$aryl, —$OR^{15}$, halogen, and hetero$C_{1-8}$alkyl; wherein each of said group can be unsubstituted or substituted with one or more $Z^1$; wherein $Z^1$ is selected from —$OR^{16}$, and $C_{1-8}$alkyl; wherein $R^{15}$, $R^{16}$ are each independently selected from the group comprising $C_{1-8}$alkyl, and $C_{6-10}$aryl; preferably $R^{15}$, $R^{16}$ are each independently $C_{1-8}$alkyl; $R^4$ is $C_{6-10}$aryl wherein said $C_{6-10}$aryl can be unsubstituted or substituted with one or more substituents $Z^1$; and $R^5$ is —$OR^{15}$;

preferably $R^3$, $R^7$, are each independently selected from hydrogen or a group comprising $C_{1-8}$alkyl, $C_{2-8}$alkenyl, $C_{6-10}$aryl, —$OR^{15}$, halogen, and hetero$C_{1-8}$alkyl; wherein each of said group can be unsubstituted or substituted with one or more $Z^1$; wherein $Z^1$ is selected from —$OR^{16}$, and $C_{1-8}$alkyl; wherein $R^{15}$, $R^{16}$ are each independently selected from the group comprising $C_{1-8}$alkyl, and $C_{6-10}$aryl; preferably $R^{15}$, $R^{16}$ are each independently $C_{1-8}$alkyl; $R^2$ and $R^6$ are each independently selected from the group comprising $C_{1-8}$alkyl, $C_{6-10}$aryl, —$OR^{15}$, halogen, and hetero$C_{1-8}$alkyl; are $R^4$ is $C_{6-10}$aryl wherein said $C_{6-10}$aryl can be unsubstituted or substituted with one or more substituents $Z^1$; and $R^5$ is —$OR^{15}$;

preferably $R^3$, $R^7$, are each independently selected from hydrogen or $C_{1-8}$alkyl, preferably hydrogen; $R^2$ and $R^6$ are each independently selected from the group comprising $C_{1-8}$alkyl, $C_{6-10}$aryl, —$OR^{15}$, halogen, and hetero$C_{1-8}$alkyl, preferably $C_{1-8}$alkyl; are $R^4$ is $C_{6-10}$aryl wherein said $C_{6-10}$aryl can be unsubstituted or substituted with one or more substituents $Z^1$; and $R^5$ is —$OR^{15}$.

4. The catalyst according to any one of statements 1-3, wherein $R^8$, $R^9$, $R^{10}$, $R^{11}$, are each independently selected from the group comprising hydrogen, $C_{1-8}$alkyl, $C_{2-8}$alkenyl, $C_{3-8}$cycloalkyl, $C_{5-8}$cycloalkenyl, $C_{5-8}$cycloalkenyl$C_{1-8}$alkyl, $C_{6-10}$aryl, $C_{1-8}$alkoxy, $C_{1-8}$alkyl$C_{6-10}$aryl, $C_{6-10}$aryl$C_{1-8}$alkyl, halogen, $Si(R^{12})_3$, and hetero$C_{1-8}$alkyl; each $R^{12}$ is independently hydrogen, $C_{1-8}$alkyl, or $C_{2-8}$alkenyl; preferably $R^8$, $R^9$, $R^{10}$, $R^{11}$, are each independently selected from the group comprising hydrogen, $C_{1-8}$alkyl, $C_{2-8}$alkenyl, $C_{6-10}$aryl, $C_{1-8}$alkoxy, halogen, and $Si(R^{12})_3$; each $R^{12}$ is independently hydrogen, or $C_{1-6}$alkyl; preferably $R^8$, $R^9$, $R^{10}$, $R^{11}$, are each independently selected from hydrogen, $C_{1-6}$alkyl, or halogen; preferably $R^8$, $R^9$, $R^{10}$, $R^{11}$, are each independently hydrogen, or $C_{1-4}$alkyl; preferably $R^8$, $R^9$, $R^{10}$, $R^{11}$, are each independently hydrogen, or $C_{1-2}$alkyl; preferably $R^8$, $R^9$, $R^{10}$, $R^{11}$, are each independently hydrogen, or methyl; preferably $R^8$, $R^9$, $R^{10}$, $R^{11}$, are each independently methyl.

5. The catalyst according to any one of statements 1-4, wherein $L^1$ is $SiR^{13}R^{14}$, $—[CR^{13}R^{14}]_h—$, $GeR^{13}R^{14}$, or $BR^{13}$; wherein h is an integer selected from 1, 2, or 3; each of $R^{13}$, and $R^{14}$ are independently selected from the group comprising hydrogen, $C_{1-8}$alkyl, $C_{2-8}$alkenyl, $C_{3-8}$cycloalkyl, $C_{5-8}$cycloalkenyl, $C_{5-8}$cycloalkenyl$C_{1-8}$alkyl, $C_{6-10}$aryl, amino$C_{1-8}$alkyl, and $C_{6-10}$aryl$C_{1-8}$alkyl; or $R^{13}$ and $R^{14}$ together with the atom to which they are attached form a $C_{3-8}$cycloalkyl, $C_{5-8}$cycloalkenyl or 3-8 membered heterocyclyl; preferably $L^1$ is $SiR^{13}R^{14}$, or $—[CR^{13}R^{14}]_h—$; wherein h is an integer selected from 1, or 2; each of $R^{13}$, and $R^{14}$ are independently selected from the group comprising hydrogen, $C_{1-8}$alkyl, $C_{2-8}$alkenyl, $C_{3-8}$cycloalkyl, $C_{5-8}$cycloalkenyl, and $C_{6-10}$aryl; or $R^{13}$ and $R^{14}$ together with the atom to which they are attached form a $C_{3-8}$cycloalkyl, $C_{5-8}$cycloalkenyl; preferably $L^1$ is $SiR^{13}R^{14}$, or $—[CR^{13}R^{14}]—$; each of $R^{13}$, and $R^{14}$ are independently selected from the group comprising hydrogen, $C_{1-8}$alkyl, and $C_{3-8}$cycloalkyl; or $R^{13}$ and $R^{14}$ together with the atom to which they are attached form a $C_{3-8}$cycloalkyl; preferably $L^1$ is $SiR^{13}R^{14}$, or $—[CR^{13}R^{14}]—$; each of $R^{13}$, and $R^{14}$ are independently selected from hydrogen, or $C_{1-6}$alkyl; preferably $L^1$ is $SiR^{13}R^{14}$; each of $R^{13}$, and $R^{14}$ are independently selected from hydrogen, or $C_{1-4}$alkyl; preferably $L^1$ is $SiR^{13}R^{14}$; each of $R^{13}$, and $R^{14}$ are independently selected from hydrogen, or $C_{1-2}$alkyl; preferably $L^1$ is $SiR^{13}R^{14}$; each of $R^{13}$, and $R^{14}$ are independently selected from hydrogen, or methyl; preferably $L^1$ is $SiMe_2$.

6. The catalyst according to any one of statements 1-5, wherein $M^1$ is a transition metal selected from the group comprising zirconium, titanium, hafnium, and vanadium; and preferably M is zirconium; and $Q^1$ and $Q^2$ are each independently selected from the group consisting of halogen, $C_{1-8}$alkyl, $—N(R^{17})_2$, $C_{1-8}$alkoxy, $C_{3-8}$cycloalkoxy, $C_{6-10}$aryl$C_{1-8}$alkyloxy, $C_{3-8}$cycloalkyl, $C_{6-10}$aryl, $C_{6-10}$aryloxy, $C_{1-8}$alkyl$C_{6-10}$aryl, $C_{6-10}$aryl$C_{1-8}$alkyl, and hetero$C_{1-8}$alkyl; wherein each $R^{17}$ is independently selected from the group comprising hydrogen, $C_{1-8}$alkyl, $Si(R^{12})_3$, $C_{3-8}$cycloalkyl, $C_{6-10}$aryl, $C_{1-8}$alkyl$C_{6-10}$aryl, $C_{6-10}$aryl$C_{1-8}$alkyl, and hetero$C_{1-8}$alkyl; preferably each $R^{17}$ is independently selected from the group comprising hydrogen, $C_{1-20}$alkyl, $Si(R^{12})_3$, $C_{3-20}$cycloalkyl, $C_{6-20}$aryl, $C_{1-20}$alkyl$C_{6-20}$aryl, $C_{6-20}$aryl$C_{1-20}$alkyl, and hetero$C_{1-20}$alkyl, preferably each $R^{17}$ is independently selected from hydrogen or $C_{1-8}$alkyl; each $R^{12}$ is independently hydrogen, or $C_{1-8}$alkyl; preferably $Q^1$ and $Q^2$ are each independently selected from the group consisting of halogen, $C_{1-8}$alkyl, $C_{1-8}$alkoxy, and hetero$C_{1-8}$alkyl; preferably $Q^1$ and $Q^2$ are each independently selected from the group consisting of halogen, or $C_{1-8}$alkyl; preferably $Q^1$ and $Q^2$ are each independently selected from the group consisting of halogen, or $C_{1-8}$alkyl; preferably $Q^1$ and $Q^2$ are each independently halogen, preferably chloro.

7. The catalyst according to any one of statements 1-6, wherein $R^2$, $R^3$, $R^4$, $R^5$, $R^6$, $R^7$, are each independently selected from hydrogen or a group comprising $C_{1-8}$alkyl, $C_{2-8}$alkenyl, $C_{6-10}$aryl, $—OR^{15}$; wherein each of said group can be unsubstituted or substituted with one or more substituents $Z^1$; wherein $Z^1$ is selected from $—OR^{16}$, $C_{1-6}$alkyl, and $C_{2-6}$alkenyl; wherein $R^{15}$, $R^{16}$ are each independently selected from the group comprising $C_{1-6}$alkyl, $C_{6-10}$aryl$C_{1-8}$alkyl, $C_{7-8}$alkyl$C_{6-10}$aryl and $C_{6-10}$aryl; preferably $R^{15}$, $R^{16}$ are each independently $C_{1-6}$alkyl;

and wherein at least one of $R^3$, $R^4$, $R^5$, $R^6$, $R^7$ is $—OR^{15}$, $R^8$, $R^9$, $R^{10}$, $R^{11}$, are each independently selected from the group comprising hydrogen, $C_{1-8}$alkyl, $C_{2-8}$alkenyl, $C_{6-10}$aryl, and $C_{1-8}$alkoxy;

$L^1$ is $SiR^{13}R^{14}$, or $—[CR^{13}R^{14}]_h—$; wherein h is an integer selected from 1, or 2; each of $R^{13}$, and $R^{14}$ are independently selected from the group comprising hydrogen, $C_{1-8}$alkyl, $C_{2-8}$alkenyl, $C_{3-8}$cycloalkyl, $C_{5-8}$cycloalkenyl; or $R^{13}$ and $R^{14}$ together with the atom to which they are attached form a $C_{3-8}$cycloalkyl, or $C_{5-8}$cycloalkenyl;

$M^1$ is zirconium, or titanium; preferably M is zirconium; and $Q^1$ and $Q^2$ are each independently selected from the group consisting of halogen, $C_{1-8}$alkyl, and $C_{1-8}$alkoxy; preferably $Q^1$ and $Q^2$ are each independently selected from the group consisting of halogen, or $C_{1-8}$alkyl.

8. The catalyst according to any one of statements 1-7, wherein $R^2$, $R^3$, $R^4$, $R^5$, $R^6$, $R^7$, are each independently selected from hydrogen or a group selected from $C_{1-6}$alkyl, $C_{6-10}$aryl, or $—OR^{15}$; wherein each of said group can be unsubstituted or substituted with one or more substituents $Z^1$; wherein $Z^1$ is selected from $—OR^{16}$, or $C_{1-6}$alkyl; wherein $R^{15}$, $R^{16}$ are each independently $C_{1-6}$alkyl;

and wherein at least one of $R^3$, $R^4$, $R^5$, $R^6$, $R^7$ is $—OR^{15}$, $R^8$, $R^9$, $R^{10}$, $R^{11}$, are each independently selected from the group comprising hydrogen, $C_{1-6}$alkyl, and $C_{2-6}$alkenyl; preferably $R^8$, $R^9$, $R^{10}$, $R^{11}$, are each independently selected from hydrogen, or $C_{1-6}$alkyl; preferably $R^8$, $R^9$, $R^{10}$, $R^{11}$, are each independently selected from hydrogen, or $C_{1-4}$alkyl; preferably $R^8$, $R^9$, $R^{10}$, $R^{11}$, are each independently selected from hydrogen, or $C_{1-2}$alkyl; preferably $R^8$, $R^9$, $R^{10}$, $R^{11}$, are each independently selected from hydrogen, or methyl; preferably $R^8$, $R^9$, $R^{10}$, $R^{11}$, are each independently methyl;

$L^1$ is $SiR^{13}R^{14}$, or $—[CR^{13}R^{14}]_h—$; wherein h is an integer selected from 1, or 2; each of $R^{13}$, and $R^{14}$ are independently selected from the group comprising hydrogen, $C_{1-6}$alkyl, $C_{3-6}$cycloalkyl; or $R^{13}$ and $R^{14}$ together with the atom to which they are attached form a $C_{3-6}$cycloalkyl; preferably $L^1$ is $SiR^{13}R^{14}$, or $—[CR^{13}R^{14}]_h—$; wherein h is 1; each of $R^{13}$, and $R^{14}$ are independently selected from hydrogen, or $C_{1-6}$alkyl; preferably $L^1$ is $SiR^{13}R^{14}$; each of $R^{13}$, and $R^{14}$ are independently selected from hydrogen, or $C_{1-6}$alkyl; preferably $L^1$ is $SiR^{13}R^{14}$; each of $R^{13}$, and $R^{14}$ are independently selected from hydrogen, or $C_{1-4}$alkyl; preferably $L^1$ is $SiR^{13}R^{14}$; each of $R^{13}$, and $R^{14}$ are independently selected from hydrogen, or methyl; preferably $L^1$ is $SiMe_2$;

M is zirconium; and $Q^1$ and $Q^2$ are each independently selected from halogen, or $C_{1-6}$alkyl; preferably $Q^1$ and $Q^2$ are each independently selected from the group consisting of chloro, fluoro, or $C_{1-4}$alkyl, preferably $Q^1$ and $Q^2$ are each independently chloro.

9. The catalyst according to any one of statements 1-8, wherein $R^5$ is —$OR^{15}$.

10. The catalyst according to any one of statements 1-9, having formula (II)

(II)

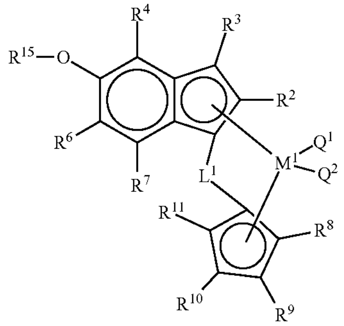

wherein $R^2$, $R^3$, $R^4$, $R^{15}$, $R^6$, $R^7$, $R^8$, $R^9$, $R^{10}$, $R^{11}$, $L^1$, $M^1$, $Q^1$, $Q^2$ have the same meaning as in any one of statements 1-9.

11. The catalyst according to any one of statements 1-10, wherein $R^4$ is aryl unsubstituted or substituted with one or more $Z^1$.

12. The catalyst according to any one of statements 1-11, having formula (III) or (IV), (III)

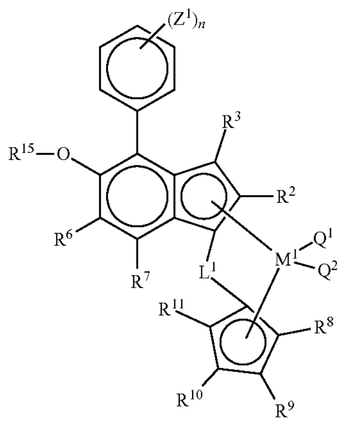

-continued (IV)

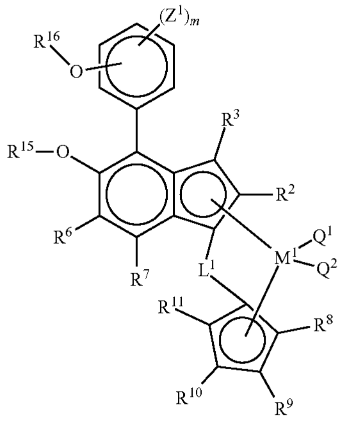

wherein n is an integer selected from 0, 1, 2, 3 or 4; m is an integer selected from 0, 1, 2, or 3; and wherein $R^2$, $R^3$, $R^{15}$, $R^{16}$, $R^6$, $R^7$, $R^8$, $R^9$, $R^{10}$, $R^{11}$, $L^1$, $Z^1$, $M^1$, $Q^1$, $Q^2$ have the same meaning as in any one of statements 1-11.

13. The catalyst according to any one of statements 1-12, wherein $R^8$, $R^9$, $R^{10}$, $R^{11}$, are each independently hydrogen, or $C_{1-8}$alkyl; preferably $R^8$, $R^9$, $R^{10}$, $R^{11}$, are each independently hydrogen, $C_{1-6}$alkyl; preferably $R^8$, $R^9$, $R^{10}$, $R^{11}$, are each independently hydrogen, or $C_{1-4}$alkyl; preferably $R^8$, $R^9$, $R^{10}$, $R^{11}$, are each independently hydrogen, or $C_{1-2}$alkyl; preferably $R^8$, $R^9$, $R^{10}$, $R^{11}$, are each independently hydrogen, or methyl; preferably $R^8$, $R^9$, $R^{10}$, $R^{11}$, are each independently methyl.

14. The catalyst according to any one of statements 1-13, having formula (V) or (VI), (V)

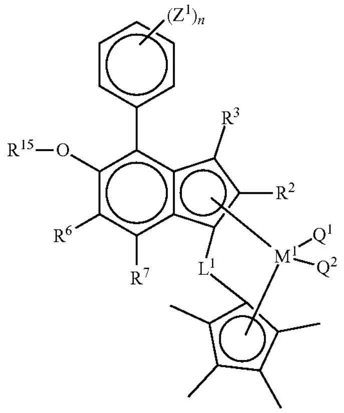

-continued (VI)

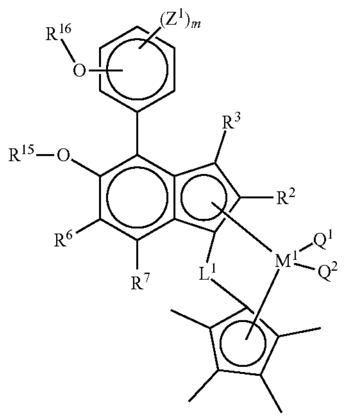

wherein n is an integer selected from 0, 1, 2, 3 or 4, m is an integer selected from 0, 1, 2, or 3; and wherein $R^2$, $R^3$, $R^{15}$, $R^{16}$, $R^6$, $R^7$, $L^1$, $Z^1$, $M^1$, $Q^1$, $Q^2$ have the same meaning as in any one of statements 1-13.

15. The catalyst according to any one of statements 1-14, wherein $L^1$ is $SiR^{13}R^{14}$, or —$[CR^{13}R^{14}]$—, and $R^{13}$, $R^{14}$ have the same meaning as that defined in any one of statements 1-14, preferably $L^1$ is preferably $SiR^{13}R^{14}$, preferably $R^{13}$, $R^{14}$ are each independently selected from hydrogen or alkyl, preferably $R^{13}$, $R^{14}$ are each independently alkyl, preferably $C_{1-6}$alkyl, preferably $C_{1-4}$alkyl, preferably $C_{1-2}$alkyl, preferably methyl.

16. The catalyst according to any one of statements 1-15, having formula (VII) or (VIII), (VII)

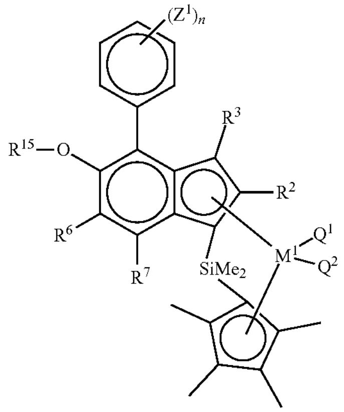

-continued (VIII)

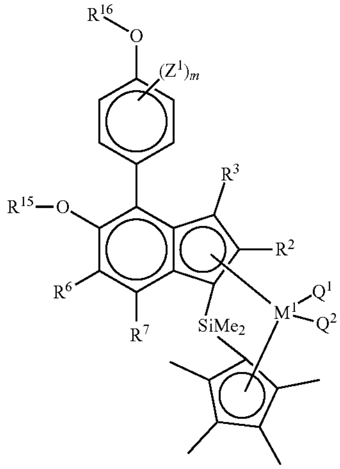

wherein n is an integer selected from 0, 1, 2, 3 or 4, m is an integer selected from 0, 1, 2, or 3; and wherein $R^2$, $R^3$, $R^{15}$, $R^{18}$, $R^8$, $R^7$, $Z^1$, $M^1$, $Q^1$, $Q^2$ have the same meaning as in any one of statements 1-15.

17. The catalyst according to any one of statements 1-16, having formula (IX) or (X), (IX)

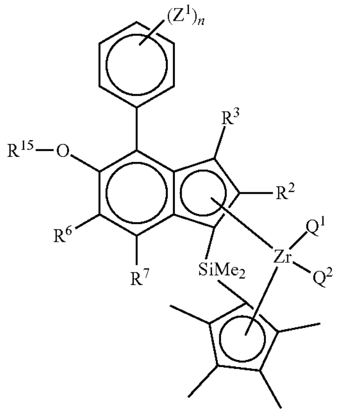

(X)

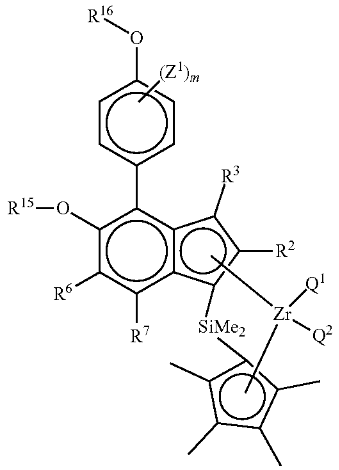

wherein n is an integer selected from 0, 1, 2, 3 or 4, m is an integer selected from 0, 1, 2, or 3; and wherein $R^2$, $R^3$, $R^{15}$, $R^{18}$, $R^6$, $R^7$, $Z^1$, $Q^1$, $Q^2$ have the same meaning as in any one of statements 1-16.

18. The catalyst according to any one of statements 1-17, having formula (XI) or (XII), (XI)

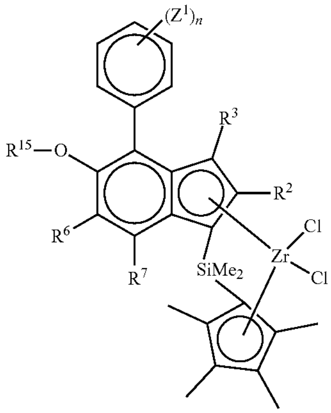

(XII)

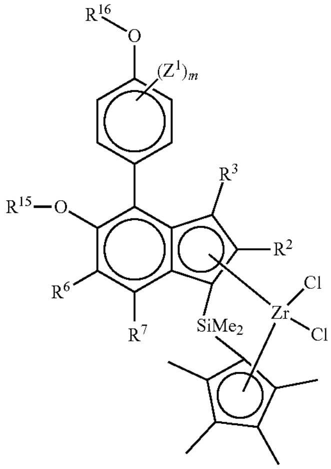

wherein n is an integer selected from 0, 1, 2, 3 or 4, m is an integer selected from 0, 1, 2, or 3; and wherein $R^2$, $R^3$, $R^{15}$, $R^{16}$, $R^6$, $R^7$, $Z^1$, have the same meaning as in any one of statements 1-17.

19. The catalyst according to any one of statements 1-18, having formula (XIII) or (XIV), (XIII)

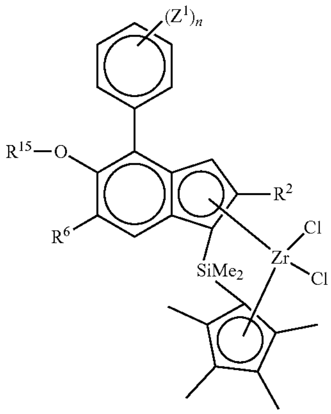

-continued (XIV)

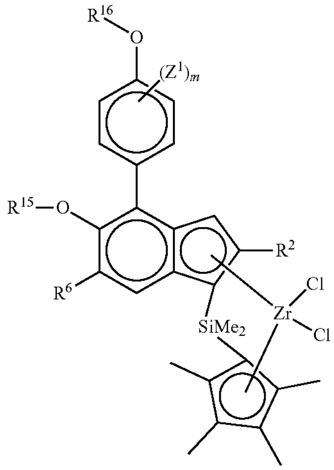

wherein n is an integer selected from 0, 1, 2, 3 or 4, m is an integer selected from 0, 1, 2, or 3; and wherein $R^2$, $R^6$, $R^{15}$, $R^{16}$, $Z^1$, have the same meaning as in any one of statements 1-18.

20. The catalyst according to any one of statements 1-18, wherein $R^2$, $R^3$, are each independently selected from hydrogen or $C_{1-6}$alkyl.

21. The catalyst according to any one of statements 1-20, having formula (XV) or (XVI), (XV)

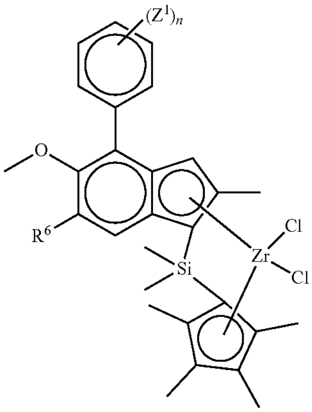

-continued (XVI)

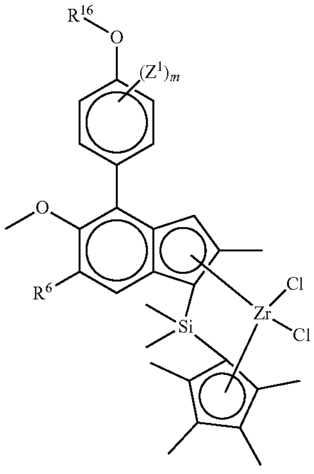

wherein n is an integer selected from 0, 1, 2, 3 or 4, m is an integer selected from 0, 1, 2, or 3; and wherein $R^6$, $Z^1$, have the same meaning as any one of statements 1-20.

22. The catalyst according to any one of statements 1-21, having formula (XVII) or (XVIII), (XVII)

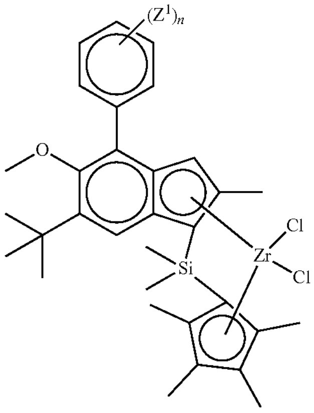

(XVIII)

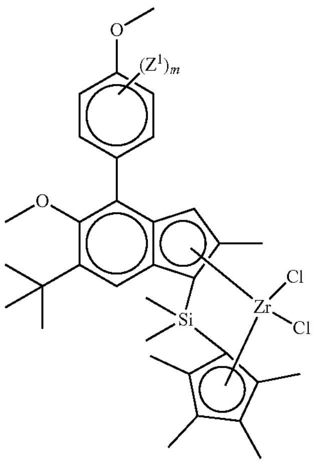

wherein n is an integer selected from 0, 1, 2, 3 or 4; m is an integer selected from 0, 1, 2 or 3; and wherein $Z^1$ has the same meaning as in any one of statements 1-21.

23. The catalyst according to any one of statements 1-22, having formula (XIX) or (XX), (XIX)

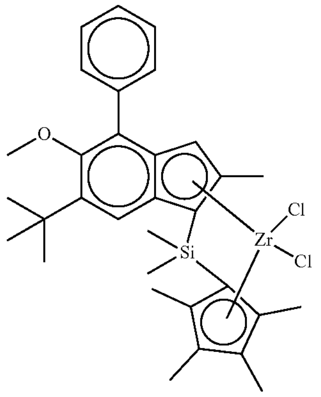

(XX)

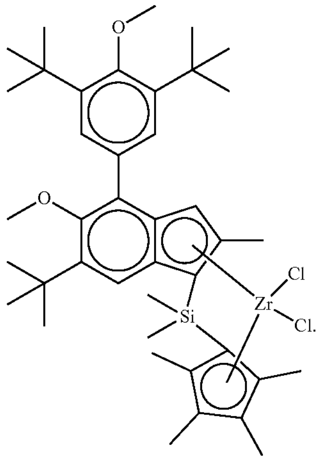

24. A supported catalyst comprising a catalyst according to any one of statements 1-23, and a support, preferably an inorganic porous support.

25. A catalyst composition comprising:

at least one catalyst according to any one of statements 1-24;

an optional activator; an optional support; and an optional co-catalyst.

26. The catalyst composition according to statement 25, wherein the catalyst composition comprises an activator, preferably wherein the activator comprises an aluminoxane compound, an organoboron or organoborate compound, an ionizing ionic compound, or any combination thereof; preferably wherein the activator is methyl alumoxane.

27. The catalyst composition according to any one of statements 25-26, wherein the activator comprises at least one alumoxane compound of formula (A1) or (A2)

$R^a$—$(Al(R^a)$—$O)_x$—$AlR^a_2$ (A1) for oligomeric, linear alumoxanes; or (—$Al(R^a)$—O—$)_y$ (A2) for oligomeric, cyclic alumoxanes wherein x is 1-40, and preferably 10-20;

wherein y is 3-40, and preferably 3-20; and wherein each $R^a$ is independently selected from a $C_{1-8}$alkyl, and preferably is methyl.

28. The catalyst composition according to any one of statements 25-27, wherein the activator is methyl alumoxane.
29. The catalyst composition according to any one of statements 25-28, wherein the catalyst composition comprises a co-catalyst.
30. The catalyst composition according to any one of statements 25-29, wherein the catalyst composition comprises an organoaluminum co-catalyst.
31. The catalyst composition according to any one of statements 25-30, wherein the catalyst composition comprises a co-catalyst, preferably an organoaluminum cocatalyst, preferably selected from the group comprising trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and any combination thereof.
32. The catalyst composition according to any one of statements 25-31, or the supported catalyst of statement 24, wherein the support comprises a solid oxide, preferably a solid inorganic oxide, preferably, the solid oxide comprises titanated silica, silica, alumina, silica-alumina, silica-coated aluminum alumina, phosphate, aluminophosphate, heteropolytungstate, titania, zirconia, magnesia, boria, zinc oxide, a mixed oxide thereof, or any mixture thereof; preferably silica, titanated silica, silica treated with fluoride, silica-alumina, alumina treated with fluoride, sulfated alumina, silica-alumina treated with fluoride, sulfated silica-alumina, silica-coated alumina, silica treated with fluoride, sulfated silica-coated alumina, or any combination thereof.
33. The catalyst composition according to any one of statements 25-32, wherein the support comprises a solid oxide comprising titanated silica, silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof.
34. The catalyst composition according to any one of statements 25-33, comprising an alumoxane activator; and a titanated silica or silica solid support; and an optional co-catalyst.
35. Use of the catalyst according to any one of statements 1 to 24, or use of a catalyst composition according to any one of statements 25-34 for the preparation of an olefin polymer.
36. Use of the catalyst according to any of the preceding statements 1 to 24, or use of a catalyst composition according to any one of statements 25-34 for the preparation of a polypropylene preferably a propylene homopolymers, propylene random copolymers and heterophasic propylene copolymers.
37. An olefin polymerization process, the process comprising: contacting a catalyst according to any one of statements 1-24 or a catalyst composition according to any one of statements 25-34, with an olefin monomer, optionally hydrogen, and optionally one or more olefin comonomers; and polymerizing the monomer, and the optionally one or more olefin comonomers, in the presence of the at least one catalyst composition, and optional hydrogen, thereby obtaining an olefin polymer.
38. The process according to statement 37, wherein the process is performed in the slurry phase or gas phase or liquid phase.
39. The process according to any one of statements 37-38, wherein the process is conducted in one or more batch reactors, slurry reactors, gas-phase reactors, solution reactors, high pressure reactors, tubular reactors, autoclave reactors, or a combination thereof.
40. The process according to any one of statements 37-39, wherein the process is conducted in a single reaction zone.
41. The process according to any one of statements 37-40, wherein the olefin monomer is propylene, and the olefin comonomer comprises ethylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-I-hexene, 1-heptene, 2-heptene, 3-heptene, 1-octene, 1-decene, styrene, or a mixture thereof.
42. The process according to any one of statements 37-41, wherein the olefin monomer is ethylene, and the olefin comonomer comprises propylene, 1-butene, 2-butene, 3-methyl-1-butene, isobutylene, 1-pentene, 2-pentene, 3-methyl-I-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.
43. A process for the preparation of a polypropylene comprising polymerizing propylene in the presence of a catalyst according to any one of statements 1-24, or in the presence of a catalyst composition according to any one of statements 25-34 to form a polypropylene.
44. An olefin polymer at least partially catalyzed by at least one catalyst according to any one of statements 1-24, or at least one catalyst composition according to any one of statements 24-34 or produced by the process according to any one of statements 37-43.
45. The olefin polymer according to statement 44, wherein said olefin polymer is polypropylene.
46. An article comprising the olefin polymer according to any one of statements 44-45.

As used herein, the term “catalyst” refers to a substance that causes a change in the rate of a reaction. In the present invention, it is especially applicable to catalysts suitable for a polymerization, preferably for the polymerization of olefins to olefin polymers.

The term “metallocene catalyst” is used herein to describe any transition metal complexes comprising metal atoms bonded to one or more ligands. The metallocene catalysts are compounds of Group IV transition metals of the Periodic Table such as titanium, zirconium, hafnium, etc., and have a coordinated structure with a metal compound and ligands. Metallocenes comprise a single metal site, which allows for more control of branching and molecular weight distribution of the polymer. Monomers are inserted between the metal and the growing chain of polymer.

In some embodiments, the present invention provides a metallocene catalyst of any one of formula (I) to (XVIII), wherein $R^2$, $R^3$, $R^4$, $R^5$, $R^6$, $R^7$, are each independently selected from hydrogen or a group comprising $C_{1-8}$alkyl, $C_{2-8}$alkenyl, $C_{3-8}$cycloalkyl, $C_{5-8}$cycloalkenyl, $C_{5-8}$cycloalkenyl$C_{1-8}$alkyl, $C_{6-10}$aryl, —$OR^{15}$, $C_{1-8}$alkyl-$C_{6-10}$aryl, $C_{6-10}$aryl$C_{1-8}$alkyl, halogen, $Si(R^{12})_3$, and hetero$C_{1-8}$alkyl; wherein each of said group can be unsubstituted or substituted with one or more substituents $Z^1$; wherein $Z^1$ is selected from —$OR^{16}$, $C_{1-8}$alkyl, and $C_{2-8}$alkenyl; each $R^{12}$ is independently hydrogen, $C_{1-8}$alkyl, or $C_{2-8}$alkenyl; wherein $R^{15}$, $R^{16}$ are each independently selected from the group comprising $C_{1-8}$alkyl, $C_{6-10}$aryl$C_{1-8}$alkyl, $C_{7-8}$alkyl$C_{6-10}$aryl and $C_{6-10}$aryl; preferably $R^{15}$, $R^{16}$ are each independently $C_{1-8}$alkyl; and wherein at least one of $R^3$, $R^4$, $R^5$, $R^6$, $R^7$ is —$OR^{15}$; preferably at least one of $R^4$, $R^5$, $R^6$, $R^7$ is —$OR^{15}$; preferably at least one of $R^4$, $R^5$, $R^6$, is —$OR^{15}$; preferably at least one of $R^5$, $R^6$, is —$OR^{15}$;

$R^8$, $R^9$, $R^{10}$, $R^{11}$, are each independently selected from the group comprising hydrogen, $C_{1-8}$alkyl, $C_{2-8}$alkenyl, $C_{3-8}$cycloalkyl, $C_{5-8}$cycloalkenyl, $C_{5-8}$cycloalkenyl-$C_{1-8}$alkyl, $C_{6-10}$aryl, $C_{1-8}$alkoxy, $C_{1-8}$alkyl$C_{6-10}$aryl, $C_{6-10}$aryl$C_{1-8}$alkyl, halogen, $Si(R^{12})_3$, and hetero-$C_{1-8}$alkyl; each $R^{12}$ is independently hydrogen, $C_{1-8}$alkyl, or $C_{2-8}$alkenyl;

$L^1$ is $SiR^{13}R^{14}$, or —$[CR^{13}R^{14}]_h$—; wherein h is an integer selected from 1, or 2; each of $R^{13}$, and $R^{14}$ are independently selected from the group comprising hydrogen, $C_{1-8}$alkyl, $C_{2-8}$alkenyl, $C_{3-8}$cycloalkyl, $C_{5-8}$cycloalkenyl, and $C_{6-10}$aryl; or $R^{13}$ and $R^{14}$ together with the atom to which they are attached form a $C_{3-8}$cycloalkyl, $C_{5-8}$cycloalkenyl; preferably $L^1$ is $SiR^{13}R^{14}$, or —$[CR^{13}R^{14}]$—; each of $R^{13}$, and $R^{14}$ are independently selected from the group comprising hydrogen, $C_{1-8}$alkyl, and $C_{3-8}$cycloalkyl; or $R^{13}$ and $R^{14}$ together with the atom to which they are attached form a $C_{3-8}$cycloalkyl; preferably $L^1$ is $SiR^{13}R^{14}$, or —$[CR^{13}R^{14}]$—; each of $R^{13}$, and $R^{14}$ are independently selected from hydrogen, or $C_{1-6}$alkyl; preferably $L^1$ is $SiR^{13}R^{14}$; each of $R^{13}$, and $R^{14}$ are independently selected from hydrogen, or $C_{1-4}$alkyl; preferably $L^1$ is $SiR^{13}R^{14}$; each of $R^{13}$, and $R^{14}$ are independently selected from hydrogen, or $C_{1-2}$alkyl; preferably $L^1$ is $SiR^{13}R^{14}$; each of $R^{13}$, and $R^{14}$ are independently selected from hydrogen, or methyl; preferably $L^1$ is $SiMe_2$.

In some embodiments, the present invention provides a metallocene catalyst of any one of formula (I) to (XVI), wherein $R^2$, $R^3$, $R^4$, $R^6$, $R^7$, are each independently selected from hydrogen or a group comprising $C_{1-8}$alkyl, $C_{2-8}$alkenyl, $C_{3-8}$cycloalkyl, $C_{5-8}$cycloalkenyl, $C_{5-8}$cyclo-alkenyl$C_{1-8}$alkyl, $C_{6-10}$aryl, —$OR^{15}$, $C_{1-8}$alkyl$C_{6-10}$ aryl, $C_{6-10}$aryl$C_{1-8}$alkyl, halogen, $Si(R^{12})_3$, and hetero$C_{1-8}$alkyl; wherein each of said group can be unsubstituted or substituted with one or more substituents $Z^1$; wherein $Z^1$ is selected from —$OR^{16}$, $C_{1-8}$alkyl, and $C_{2-8}$alkenyl; each $R^{12}$ is independently hydrogen, $C_{1-8}$alkyl, or $C_{2-8}$alkenyl; wherein $R^{15}$, $R^{16}$ are each independently selected from the group comprising $C_{1-8}$alkyl, $C_{6-10}$aryl$C_{1-8}$alkyl, $C_{7-8}$alkyl$C_{6-10}$aryl and $C_{6-10}$aryl; preferably $R^{15}$, $R^{16}$ are each independently $C_{1-8}$alkyl; and $R^5$ is —$OR^{15}$;

$R^8$, $R^9$, $R^{10}$, $R^{11}$, are each independently selected from the group comprising hydrogen, $C_{1-8}$alkyl, $C_{2-8}$alkenyl, $C_{6-10}$aryl, $C_{1-8}$alkoxy, halogen, and $Si(R^{12})_3$; each $R^{12}$ is independently hydrogen, or $C_{1-6}$alkyl;

$L^1$ is $SiR^{13}R^{14}$, or —$[CR^{13}R^{14}]$—; each of $R^{13}$, and $R^{14}$ are independently selected from the group comprising hydrogen, $C_{1-8}$alkyl, and $C_{3-8}$cycloalkyl; or $R^{13}$ and $R^{14}$ together with the atom to which they are attached form a $C_{3-8}$cycloalkyl; preferably $L^1$ is $SiR^{13}R^{14}$, or —$[CR^{13}R^{14}]$—; each of $R^{13}$, and $R^{14}$ are independently selected from hydrogen, or $C_{1-6}$alkyl; preferably $L^1$ is $SiR^{13}R^{14}$; each of $R^{13}$, and $R^{14}$ are independently selected from hydrogen, or $C_{1-4}$alkyl; preferably $L^1$ is $SiR^{13}R^{14}$; each of $R^{13}$, and $R^{14}$ are independently selected from hydrogen, or $C_{1-2}$alkyl; preferably $L^1$ is $SiR^{13}R^{14}$; each of $R^{13}$, and $R^{14}$ are independently selected from hydrogen, or methyl; preferably $L^1$ is $SiMe_2$.

In some embodiments, the present invention provides a metallocene catalyst of any one of formula (I) to (XVIII), wherein $R^2$, $R^3$, $R^6$, $R^7$, are each independently selected from hydrogen or a group comprising $C_{1-8}$alkyl, $C_{2-8}$alkenyl, $C_{3-8}$cycloalkyl, $C_{5-8}$cycloalkenyl, $C_{5-8}$cycloalkenyl-$C_{1-8}$alkyl, $C_{6-10}$aryl, —$OR^{15}$, $C_{1-8}$alkyl$C_{6-10}$aryl, $C_{6-10}$aryl$C_{1-8}$alkyl, halogen, $Si(R^{12})_3$, and hetero-$C_{1-8}$alkyl; wherein each of said group can be unsubstituted or substituted with one or more $Z^1$; wherein $Z^1$ is selected from —$OR^{16}$, $C_{1-8}$alkyl, and $C_{2-8}$alkenyl; each $R^{12}$ is independently hydrogen, $C_{1-8}$alkyl, or $C_{2-8}$alkenyl; wherein $R^{15}$, $R^{16}$ are each independently selected from the group comprising $C_{1-8}$alkyl, $C_{6-10}$aryl$C_{1-8}$alkyl, $C_{7-8}$alkyl$C_{6-10}$aryl and $C_{6-10}$aryl; preferably $R^{15}$, $R^{16}$ are each independently $C_{1-8}$alkyl; $R^4$ is $C_{6-10}$aryl wherein said $C_{6-10}$aryl can be unsubstituted or substituted with one or more substituents $Z^1$; and $R^5$ is —$OR^{15}$;

$R^8$, $R^9$, $R^{10}$, $R^{11}$, are each independently hydrogen, or $C_{1-4}$alkyl; preferably $R^8$, $R^9$, $R^{10}$, $R^{11}$, are each independently hydrogen, or $C_{1-2}$alkyl; preferably $R^8$, $R^9$, $R^{10}$, $R^{11}$, are each independently hydrogen, or methyl; preferably $R^8$, $R^9$, $R^{10}$, $R^{11}$, are each independently methyl.

$L^1$ is $SiR^{13}R^{14}$, or —$[CR^{13}R^{14}]$—; each of $R^{13}$, and $R^{14}$ are independently selected from hydrogen, or $C_{1-6}$alkyl; preferably $L^1$ is $SiR^{13}R^{14}$; each of $R^{13}$, and $R^{14}$ are independently selected from hydrogen, or $C_{1-4}$alkyl; preferably $L^1$ is $SiR^{13}R^{14}$; each of $R^{13}$, and $R^{14}$ are independently selected from hydrogen, or $C_{1-2}$alkyl; preferably $L^1$ is $SiR^{13}R^{14}$; each of $R^{13}$, and $R^{14}$ are independently selected from hydrogen, or methyl; preferably $L^1$ is $SiMe_2$.

In some embodiments, the present invention provides a metallocene catalyst of any one of formula (I) to (XVIII), wherein $R^2$, $R^3$, $R^6$, $R^7$, are each independently selected from hydrogen or a group comprising $C_{1-8}$alkyl, $C_{2-8}$alkenyl, $C_{6-10}$aryl, —$OR^{15}$, halogen, and hetero$C_{1-8}$alkyl; wherein each of said group can be unsubstituted or substituted with one or more $Z_1$; wherein $Z_1$ is selected from —$OR^{16}$, and $C_{1-8}$alkyl; wherein $R^{15}$, $R^{16}$ are each independently selected from the group comprising $C_{1-8}$alkyl, and $C_{6-10}$aryl; preferably $R^{15}$, $R^{16}$ are each independently $C_{1-8}$alkyl; $R^4$ is $C_{6-10}$aryl wherein said $C_{6-10}$aryl can be unsubstituted or substituted with one or more substituents $Z^1$; and $R^5$ is —$OR^{15}$;

$R^8$, $R^9$, $R^{10}$, $R^{11}$, are each independently selected from hydrogen, $C_{1-6}$alkyl, or halogen; preferably $R^8$, $R^9$, $R^{10}$, $R^{11}$, are each independently hydrogen, or $C_{1-4}$alkyl; preferably $R^8$, $R^9$, $R^{10}$, $R^{11}$, are each independently hydrogen, or $C_{1-2}$alkyl; preferably $R^8$, $R^9$, $R^{10}$, $R^{11}$, are each independently hydrogen, or methyl; preferably $R^8$, $R^9$, $R^{10}$, $R^{11}$, are each independently methyl.

$L^1$ is $SiR^{13}R^{14}$; each of $R^{13}$, and $R^{14}$ are independently selected from hydrogen, or $C_{1-2}$alkyl; preferably $L^1$ is $SiR^{13}R^{14}$; each of $R^{13}$, and $R^{14}$ are independently selected from hydrogen, or methyl; preferably $L^1$ is $SiMe_2$.

In some embodiments, the present invention provides a metallocene catalyst of any one of formula (I) to (XVIII), wherein $R^3$, $R^7$, are each independently selected from hydrogen or a group comprising $C_{1-8}$alkyl, $C_{2-8}$alkenyl, $C_{6-10}$aryl, —$OR^{15}$, halogen, and hetero$C_{1-8}$alkyl; wherein each of said group can be unsubstituted or substituted with one or more $Z^1$; wherein $Z^1$ is selected from —$OR^{16}$, and $C_{1-8}$alkyl; wherein $R^{15}$, $R^{16}$ are each independently selected from the group comprising $C_{1-8}$alkyl, and $C_{6-10}$aryl; preferably $R^{15}$, $R^{16}$ are each independently $C_{1-8}$alkyl; $R^2$ and $R^6$ are each independently selected from the group comprising $C_{1-8}$alkyl, $C_{6-10}$aryl, —$OR^{15}$, halogen, and hetero$C_{1-8}$alkyl; are $R^4$ is $C_{6-10}$aryl wherein said $C_{6-10}$aryl can be unsubstituted or substituted with one or more substituents $Z^1$; and $R^5$ is —$OR^{15}$;

$R^8$, $R^9$, $R^{10}$, $R^{11}$, are each independently hydrogen, or $C_{1-6}$alkyl; preferably $R^8$, $R^9$, $R^{10}$, $R^{11}$, are each independently hydrogen, or $C_{1-2}$alkyl; preferably $R^8$, $R^9$, $R^{10}$, $R^{11}$, are each independently hydrogen, or methyl; preferably $R^8$, $R^9$, $R^{10}$, $R^{11}$, are each independently methyl.

$L^1$ is $SiR^{13}R^{14}$; each of $R^{13}$, and $R^{14}$ are independently selected from hydrogen, or $C_{1-4}$alkyl; preferably $L^1$ is $SiR^{13}R^{14}$; each of $R^{13}$, and $R^{14}$ are independently selected from hydrogen, or $C_{1-2}$alkyl; preferably $L^1$ is $SiR^{13}R^{14}$; each of $R^{13}$, and $R^{14}$ are independently selected from hydrogen, or methyl; preferably $L^1$ is $SiMe_2$.

In some embodiments, the present invention provides a metallocene catalyst of any one of formula (I) to (XVIII), wherein $R^3$, $R^7$, are each independently selected from hydrogen or $C_{1-8}$alkyl, preferably hydrogen; $R^2$ and $R^6$ are each independently selected from the group comprising $C_{1-8}$alkyl, $C_{6-10}$aryl, —$OR^{15}$, halogen, and hetero$C_{1-8}$alkyl, preferably $C_{1-8}$alkyl; are $R^4$ is $C_{6-10}$aryl wherein said $C_{6-10}$aryl can be unsubstituted or substituted with one or more substituents $Z^1$; and $R^5$ is —$OR^{15}$.

$R^8$, $R^9$, $R^{10}$, $R^{11}$, are each independently hydrogen, or $C_{1-6}$alkyl; preferably $R^8$, $R^9$, $R^{10}$, $R^{11}$, are each independently hydrogen, or $C_{1-2}$alkyl; preferably $R^8$, $R^9$, $R^{10}$, $R^{11}$, are each independently hydrogen, or methyl; preferably $R^8$, $R^9$, $R^{10}$, $R^{11}$, are each independently methyl.

$L^1$ is $SiR^{13}R^{14}$; each of $R^{13}$, and $R^{14}$ are independently selected from hydrogen, or $C_{1-4}$alkyl; preferably $L^1$ is $SiR^{13}R^{14}$; each of $R^{13}$, and $R^{14}$ are independently selected from hydrogen, or $C_{1-2}$alkyl; preferably $L^1$ is $SiR^{13}R^{14}$; each of $R^{13}$, and $R^{14}$ are independently selected from hydrogen, or methyl; preferably $L^1$ is $SiMe_2$.

In some embodiments, the present invention provides a metallocene catalyst of any one of formula (I) to (X), wherein $M^1$ is zirconium, or titanium; preferably M is zirconium; and $Q^1$ and $Q^2$ are each independently selected from the group consisting of halogen, $C_{1-8}$alkyl, and $C_{1-8}$alkoxy; preferably $Q^1$ and $Q^2$ are each independently selected from the group consisting of halogen such as chloro, or $C_{1-8}$alkyl.

The catalyst herein is preferably provided on a solid support.

The support can be an inert organic or inorganic solid, which is chemically unreactive with any of the components of the conventional bridged metallocene catalyst. Suitable support materials for the supported catalyst include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. For example the solid oxide comprises titanated silica, silica, alumina, silica-alumina, silica-coated alumina, aluminum phosphate, aluminophosphate, heteropolytungstate, titania, zirconia, magnesia, boria, zinc oxide, a mixed oxide thereof, or any mixture thereof, preferably silica, titanated silica, silica treated with fluoride, silica-alumina, alumina treated with fluoride, sulfated alumina, silica-alumina treated with fluoride, sulfated silica-alumina, silica-coated alumina, silica treated with fluoride, sulfated silica-coated alumina, or any combination thereof. Most preferred is a titanated silica, or a silica compound. In a preferred embodiment, the bridged metallocene catalysts are provided on a solid support, preferably a titanated silica, or a silica support. The silica may be in granular, agglomerated, fumed or other form.

In some embodiments, the support of catalyst components is a porous support, and preferably a porous titanated silica, or silica support having a surface area comprised between 200 and 900 $m^2/g$. In another embodiment, the support of the polymerization catalyst is a porous support, and preferably a porous titanated silica, or silica support having an average pore volume comprised between 0.5 and 4 ml/g. In yet another embodiment, the support of the polymerization catalyst is a porous support, and preferably a porous titanated silica, or silica support having an average pore diameter comprised between 50 and 300 Å, and preferably between 75 and 220 Å.

In some embodiments, the support has a D50 of at most 150 μm, preferably of at most 100 μm, preferably of at most 75 μm, preferably of at most 50 μm, preferably of at most 40 μm, preferably of at most 30 μm. The D50 is defined as the particle size for which fifty percent by weight of the particles has a size lower than the D50. The measurement of the particle size can be made according to the International Standard ISO 13320:2009 ("Particle size analysis-Laser diffraction methods"). For example, the D50 can be measured by sieving, by BET surface measurement, or by laser diffraction analysis. For example, Malvern Instruments' laser diffraction systems may advantageously be used. The particle size may be measured by laser diffraction analysis on a Malvern type analyzer. The particle size may be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

Preferably, the catalyst is activated by an activator. The activator can be any activator known for this purpose such as an aluminum-containing activator, a boron-containing activator, or a fluorinated activator. The aluminum-containing activator may comprise an alumoxane, an alkyl aluminum, a Lewis acid and/or a fluorinated catalytic support.

In some embodiments, alumoxane is used as an activator for the catalyst. The alumoxane can be used in conjunction with a catalyst in order to improve the activity of the catalyst during the polymerization reaction.

As used herein, the term "alumoxane" and "aluminoxane" are used interchangeably, and refer to a substance, which is capable of activating the bridged metallocene catalyst. In some embodiments, alumoxanes comprise oligomeric linear and/or cyclic alkyl alumoxanes. In a further embodiment, the alumoxane has formula (A1) or (A2)

$$R^a—(Al(R^a)—O)_x—AlR^a_2 \quad (A1)$$

for oligomeric, linear alumoxanes; or $$(—Al(R^a)—O—)_y \quad (A2)$$

for oligomeric, cyclic alumoxanes wherein x is 1-40, and preferably 10-20;

wherein y is 3-40, and preferably 3-20; and wherein each $R^a$ is independently selected from a $C_{1-8}$alkyl, and preferably is methyl. In a preferred embodiment, the alumoxane is methylalumoxane (MAO).

The catalyst composition may comprise a co-catalyst, preferably an organoaluminum co-catalyst. One or more alkylaluminum preferably represented by the formula $AlR^b_x$ can be used as additional co-catalyst, wherein each $R^b$ is the same or different and is selected from halogens or from alkoxy or alkyl groups having from 1 to 12 carbon atoms and x is from 1 to 3. Non-limiting examples are Tri-Ethyl Aluminum (TEAL), Tri-Iso-Butyl Aluminum (TIBAL), Tri-Methyl Aluminum (TMA), tri-n-propyl aluminum, tri-n-butyl aluminum, Methyl-Methyl-Ethyl Aluminum (MMEAL), tri-n-hexyl aluminum, tri-n-octyl aluminum, diisobutyl aluminum hydride, diethyl aluminum ethoxide, diethyl aluminum chloride, and any combination thereof. Especially suitable are trialkyl aluminums, the most preferred being triisobutyl aluminum (TIBAL) and triethyl aluminum (TEAL).

The catalyst composition can be particularly useful in a process for the preparation of a polymer comprising contacting at least one monomer with at least one catalyst composition. Preferably, said polymer is an olefin polymer, preferably said monomer is an alpha-olefin.

The catalyst composition of the present invention is therefore particularly suitable for being used in the preparation of an olefin polymer. The present invention also relates to the use of a catalyst composition in olefin polymerization.

The present invention also encompasses an olefin polymerization process, the process comprising: contacting a catalyst composition according to the invention, with an olefin monomer, optionally hydrogen, and optionally one or more olefin comonomers; and polymerizing the monomer, and the optionally one or more olefin comonomers, in the presence of the at least one catalyst composition, and optional hydrogen, thereby obtaining an olefin polymer.

The term "olefin" refers herein to molecules composed of carbon and hydrogen, containing at least one carbon-carbon double bond. Olefins containing one carbon-carbon double bond are denoted herein as mono-unsaturated hydrocarbons and have the chemical formula $C_nH_{2n}$, where n equals at least two. "Alpha-olefins", "α-olefins", "1-alkenes" or "terminal olefins" are used as synonyms herein and denote olefins or alkenes having a double bond at the primary or alpha (α) position.

Throughout the present application the terms "olefin polymer", "polyolefin" and "polyolefin polymer" may be used synonymously.

Suitable polymerization includes but is not limited to homopolymerization of an alpha-olefin, or copolymerization of the alpha-olefin and at least one other alpha-olefin comonomer.

As used herein, the term "comonomer" refers to olefin comonomers which are suitable for being polymerized with alpha-olefin monomer. The comonomer if present is different from the olefin monomer and chosen such that it is suited for copolymerization with the olefin monomer. Comonomers may comprise but are not limited to aliphatic $C_2$-$C_{20}$ alpha-olefins. Examples of suitable aliphatic $C_3$-$C_{20}$ alpha-olefins include ethylene, propylene, 1-butene, 1-pentene, 4-methyl-1-pentene, 1-hexene, 1-octene, 1-decene, 1-dodecene, 1-tetradecene, 1-hexadecene, 1-octadecene, and 1-eicosene. Further examples of suitable comonomers are vinyl acetate ($H_3C—C(═O)O—CH═CH_2$) or vinyl alcohol ("$HO—CH═CH_2$"). Examples of olefin copolymers suited which can be prepared can be random copolymers of propylene and ethylene, random copolymers of propylene and 1-butene, heterophasic copolymers of propylene and ethylene, ethylene-butene copolymers, ethylene-hexene copolymers, ethylene-octene copolymers, copolymers of ethylene and vinyl acetate (EVA), copolymers of ethylene and vinyl alcohol (EVOH).

In some embodiments, the olefin monomer is ethylene, and the olefin comonomer comprises propylene, 1-butene, 2-butene, 3-methyl-1-butene, isobutylene, 1-pentene, 2-pentene, 3-methyl-I-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

In some embodiments, the olefin monomer is propylene, and the olefin comonomer comprises ethylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-I-hexene, 1-heptene, 2-heptene, 3-heptene, 1-octene, 1-decene, styrene, or a mixture thereof.

The olefin polymer can be prepared out in bulk, gas, solution and/or slurry phase. The process can be conducted in one or more batch reactors, slurry reactors, gas-phase reactors, solution reactors, high pressure reactors, tubular reactors, autoclave reactors, or a combination thereof.

The term "slurry" or "polymerization slurry" or "polymer slurry", as used herein refers to substantially a multi-phase composition including at least polymer solids and a liquid phase, the liquid phase being the continuous phase. The solids may include the catalyst and polymerized monomer.

In some embodiments, the liquid phase comprises a diluent. As used herein, the term "diluent" refers to any organic diluent, which does not dissolve the synthesized polyolefin. As used herein, the term "diluent" refers to diluents in a liquid state, liquid at room temperature and preferably liquid under the pressure conditions in the loop reactor. Suitable diluents comprise but are not limited to hydrocarbon diluents such as aliphatic, cycloaliphatic and aromatic hydrocarbon solvents, or halogenated versions of such solvents. Preferred solvents are $C_{12}$ or lower, straight chain or branched chain, saturated hydrocarbons, $C_5$ to $C_9$ saturated alicyclic or aromatic hydrocarbons or $C_2$ to $C_6$ halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane, preferably isobutane or hexane.

The polymerization can also be performed in gas phase, under gas phase conditions. The term "gas phase conditions" as used herein refers to temperatures and pressures suitable for polymerizing one or more gaseous phase olefins to produce polymer therefrom.

The polymerization steps can be performed over a wide temperature range. In certain embodiments, the polymerization steps may be performed at a temperature from 20 °C to 125 °C, preferably from 60 °C to 110 °C, more preferably from 75 °C to 100 °C and most preferably from 78 °C to 98 °C. Preferably, the temperature range may be within the range from 75 °C to 100 °C and most preferably from 78 °C to 98 °C. Said temperature may fall under the more general term of polymerization conditions.

In certain embodiments, in slurry conditions, the polymerization steps may be performed at a pressure from about 20 bar to about 100 bar, preferably from about 30 bar to about 50 bar, and more preferably from about 37 bar to about 45 bar. Said pressure may fall under the more general term of polymerization conditions.

The invention also encompasses a polymer at least partially catalyzed by at least one catalyst composition according to the invention or produced by a process according to the invention.

The present invention also encompasses a polymer, preferably an olefin polymer produced by a process as defined herein. In some embodiments, said olefin polymer is polyethylene. In some embodiments, said olefin polymer is polypropylene.

After the polymer is produced, it may be formed into various articles. Such articles can be for example various polyethylene articles in extruded and injection applications including but not limited to, film products, caps and closures, rotomoulding, grass yarn, pipe, etc. Such articles can be for example various polypropylene articles in extruded and injection applications, including but not limited to, injection moulding, blow moulding, injection stretch blow moulding (ISBM), cast or blown film extrusion, sheet extrusion, thermoforming, fibers, etc.

The present invention therefore also encompasses an article comprising a polymer as defined herein; preferably an olefin polymer as defined herein, or obtained according to a process as defined herein.

The following examples serve to merely illustrate the invention and should not be construed as limiting its scope in any way. While the invention has been shown in only some of its forms, it should be apparent to those skilled in the art that it is not so limited, but is susceptible to various changes and modifications without departing from the scope of the invention.

EXAMPLES

Test Methods

The properties cited herein and cited below were determined in accordance with the following test procedures. Where any of these properties is referenced in the appended claims, it is to be measured in accordance with the specified test procedure.

Melt Flow Index

The melt flow index ($MI_2$) of ethylene polymers was determined according to ISO 1133:2005 Method B, condition D, at a temperature 190 °C, and a 2.16 kg load using a die of 2.096 mm.

The melt flow index (HLMI) of ethylene polymers was determined according to ISO 1133:2005 Method B, condition G, at a temperature 190 °C, and a 21.6 kg load using a die of 2.096 mm.

The melt flow index ($MI_2$) of polypropylene was determined according to ISO 1133:2005 Method B, condition M, at a temperature 230 °C, and a 2.16 kg load using a die of 2.096 mm.

Molecular Weight, Molecular Distribution

The molecular weight ($M_n$ (number average molecular weight), $M_w$ (weight average molecular weight) and molecular weight distributions D ($M_w/M_n$), and D' ($M_z/M_w$) were determined by size exclusion chromatography (SEC) and in particular by gel permeation chromatography (GPC). Briefly, a GPC-IR5 from Polymer Char was used: 10 mg polymer sample was dissolved at 160 °C in 10 ml of trichlorobenzene (technical grade) for 1 hour. Injection volume: about 400 µl, automatic sample preparation and injection temperature: 160 °C. Column temperature: 145 °C. Detector temperature: 160 °C. Two Shodex AT-806MS (Showa Denko) and one Styragel HT6E (Waters) columns were used with a flow rate of 1 ml/min. Mobile Phase: trichlorobenzene stabilized with 1000 ppm by weight of butylhydroxytoluene (BHT) filtered through a 0.45 µm PTFE filter. Detector: Infrared detector (2800-3000 $cm^{-1}$) to measure the concentration, one narrow filter center based at 2928 $cm^{-1}$, and one narrow filter center based at 2959 $cm^{-1}$. Calibration: narrow standards of polystyrene (PS) (commercially available).

For polyethylene, calculation of molecular weight $M_i$ of each fraction i of eluted polymer is based on the Mark-Houwink relation ($\log_{10}(M_{PE})=0.965909\times\log_{10}(M_{PS})-0.28264$) (cut off on the low molecular weight end at $M_{PE}=1000$).

For polypropylene, calculation of molecular weight $M_i$ of each fraction i of eluted polymer is based on the Mark-Houwink relation ($\log_{10}(M_{PP})=\log_{10}(M_{PS})-0.25323$ (cut off on the low molecular weight end at $M_{PP}=1000$).

The molecular weight averages used in establishing molecular weight/property relationships are the number average ($M_n$), weight average ($M_w$) and z average ($M_z$) molecular weight.

These averages are defined by the following expressions and are determined form the calculated $M_i$:

$$M_n = \frac{\sum_i N_i M_i}{\sum_i N_i} = \frac{\sum_i W_i}{\sum_i W_i/M_i} = \frac{\sum_i h_i}{\sum_i h_i/M_i}$$

$$M_w = \frac{\sum_i N_i M_i^2}{\sum_i N_i M_i} = \frac{\sum_i W_i M_i}{\sum_i W_i} = \frac{\sum_i h_i M_i}{\sum_i h_i}$$

$$M_z = \frac{\sum_i N_i M_i^3}{\sum_i N_i M_i^2} = \frac{\sum_i W_i M_i^2}{\sum_i W_i M_i} = \frac{\sum_i h_i M_i^2}{\sum_i h_i M_i}$$

Here $N_i$ and $W_i$ are the number and weight, respectively, of molecules having molecular weight $M_i$. The third representation in each case (farthest right) defines how one obtains these averages from SEC chromatograms. hi is the height (from baseline) of the SEC curve at the $i_{th}$ elution fraction and $M_i$ is the molecular weight of species eluting at this increment.

Xylene Soluble Content

Xylene soluble content was determined by dissolving the propylene polymer in refluxing xylene, cooling the solution to 25 °C, filtering the solution, and subsequently evaporating the solvent. The residue, which is the xylene soluble portion of the propylene polymer, was then dried and weighed. The protocol was as follows: around 2.5 g of propylene polymer were weighed into a flask and 250 ml xylene were added. The xylene was heated under stirring and then to reflux for 15 minutes, until dissolution. Heating and stirring were stopped, and the solution was left standing for 15 minutes exactly. The flask was then placed in a thermostated bath set to 25 °C+/−1 °C for 1 hour. The solution was filtered through Whatman n° 4 filter paper and exactly 50 ml of solution were collected. The solution was then evaporated and the residue dried and weighed. The percentage of xylene solubles ("XS") was then calculated according to XS (in wt. %)=(Weight of the residue/Initial total weight of PP)*500 with all weights being in the same units.

Differential Scanning Calorimetry (DSC) for Determination of Crystallization and Melting Temperatures Peak crystallization temperature ($T_c$), peak melting temperature ($T_m$) and heat of fusion (ΔH) were measured via Differential Scanning using DQ 2000 instrument by TA Instruments, calibrated with indium and using T zero mode. The polymer analysis was performed with a 2 to 10 mg of polymer sample. The sample was first equilibrated at 20 °C and subsequently heated to 220 °C using a heating rate of 20 °C/min (first heat). The sample was held at 220 °C for 5 min to erase any prior thermal and crystallization history. The sample was subsequently cooled down to 20 °C with a constant cooling rate of 20 °C/min (first cool). The sample was held isothermal at 20 °C for 5 min before being heated to 220 °C at a constant heating rate of 20 °C/min (second heat). The exothermic peak of crystallization (first cool) was analyzed using the TA Universal Analysis software and the peak crystallization temperature ($T_c$) corresponding to 20 °C/min cooling rate was determined. The endothermic peak of melting (second heat) was also analyzed using the TA Universal Analysis software and the peak melting temperature ($T_m$) corresponding to 20 °C/min heating rate was determined. Unless otherwise indicated, reported values of $T_c$, $T_m$ in this invention refer to a cooling and heating rate of 20 °C/min, respectively.

$^{13}$C NMR/Tacticity

Tacticity was determined by $^{13}$C-NMR spectroscopy. The $^{13}$C-NMR spectroscopic analysis was performed at an operative frequency of 125 MHz using a 500 MHz Bruker NMR spectrometer with a high temperature 10 mm cryo-probe under conditions such that the signal intensity in the spectrum is directly proportional to the total number of contributing carbon atoms in the sample. Such conditions are well known to the skilled person and include for example appropriate relaxation time, etc. In practice, the intensity of a signal is obtained from its integral, i.e. the corresponding area. The data were acquired using proton decoupling, 240 scans per spectrum, a pulse repetition delay of 11 s and a spectral width of 26000 Hz at a temperature of 130 °C. The sample was prepared by dissolving a sufficient amount of polymer in 1,2,4-trichlorobenzene (TCB, 99%, spectroscopic grade) at 130 °C and occasional agitation to homogenize the sample, followed by the addition of hexadeuterobenzene ($C_6D_6$, spectroscopic grade) and a minor amount of hexamethyldisiloxane (HMDS, 99.5+ %), with HMDS serving as internal standard. To give an example, about 600 mg of polymer were dissolved in 2.0 mL of TCB, followed by addition of 0.5 mL of $C_6D_6$ and 2 to 3 drops of HMDS.

Following data acquisition, the chemical shifts are referenced to the signal of the internal standard HMDS, which is assigned a value of 2.03 ppm.

The isotacticity is determined by $^{13}$C-NMR spectroscopic analysis on the total polymer according to procedures well known in the art. In the spectral region of the methyl groups the signals corresponding to the pentads mmmm, mmmr, mmrr and mrrm are assigned using published data, for example A. Razavi, Macromol. Symp., vol. 89, pages 345-367. Only the pentads mmmm, mmmr, mmrr and mrrm are taken into consideration. The other remaining pentads are neglected due to the weak intensity of the corresponding signals. For the signal relating to the mmrr pentad a correction is performed for its overlap with a methyl signal related to 2,1-insertions. The percentage of mmmm pentads is then calculated according to % *mmmm*=AREA*mmmm*/(AREA*mmmm*+AREA*mmmr*+AREA*mmrr*+AREA*mrrm*)*100

The regio-defects content in the polypropylene is the percentage of 2,1-insertions in the polypropylene.

For propylene homopolymers, the signals corresponding to the 2,1-insertions are identified with the aid of published data, for example H. N. Cheng, J. Ewen, Makromol. Chem., vol. 190 (1989), pages 1931-1940.

For propylene copolymers, the determination of the percentage of 2,1-insertions is detailed hereunder with respect to ethylene as co-monomer but can be applied with other comonomers.

The determination of the percentage of 2,1-insertions for a copolymer of propylene with ethylene as comonomer is determined by two contributions:

(i) the percentage of 2,1-insertions as defined above for the propylene homopolymer, and (ii) the percentage of 2,1-insertions, wherein the 2,1-inserted propylene neighbors an ethylene, Thus, the total percentage of 2,1-insertions corresponds to the sum of these two contributions. A first area, AREA1, is defined as the average area of the signals corresponding to 2,1-insertions. A second area, AREA2, is defined as the average area of the signals corresponding to 1,2-insertions. The assignment of the signals relating to the 1,2-insertions is well known to the skilled person. The percentage of 2,1-insertions is calculated according to 2,1-insertions (in %)=AREA1/(AREA1+AREA2)*100 with the percentage in 2,1-insertions being given as the molar percentage of 2,1-inserted propylene with respect to total propylene.

The assignments of the signal for case (ii) can be done either by using reference spectra or by referring to the published literature.

Comonomer Content

Co-monomer content of the polypropylene: The total co-monomer content (in particular ethylene ($C_2$) i.e. $C_2$ % by weight) relative to the total weight of the polypropylene composition was determined using $^{13}$C NMR.

The sample was prepared by dissolving a sufficient amount of polymer in 1,2,4-trichlorobenzene (TCB 99% spectroscopic grade) at 130 °C and occasional agitation to homogenize the sample, followed by the addition of hexadeuterobenzene ($C_6D_6$, spectroscopic grade) and a minor amount of hexamethyldisiloxane (HMDS, 99.5+ %), with HMDS serving as internal standard. To give an example, about 600 mg of polymer were dissolved in 2.0 ml of TCB, followed by addition of 0.5 ml of $C_6D_6$ and 2 to 3 drops of HMDS.

$^{13}$C NMR signal was recorded on a Bruker 500 MHz with a 10 mm probe using the conditions listed in the Table 1.

TABLE 1

| |
|---|
| Pulse angle: 90° |
| Pulse repetition time: 20 s |
| Spectral width: 25000 Hz centered at 95 ppm |
| Data points: 64K |
| Temperature: 130 °C +/− 2 °C |
| Rotation: 15 Hz |
| Scan numbers: 2000-4000 |
| Decoupling sequence: inverse-gated decoupling sequence to avoid NOE effect |

$^{13}C\{^1H\}$ NMR spectrum was obtained by Fourier Transform on 131 K points after a light Gaussian multiplication. Spectrum was phased, baseline corrected and chemical shift scale was referenced to the internal standard HMDS at 2.03 ppm.

Chemical shifts of signals are peak picked and peaks are integrated as shown in FIG. 2 and in the following Table 2.

TABLE 2

| Region | Shift (ppm) |
|---|---|
| A | 22.80-19.6 |
| B | 42.37-42.18 |
| C | 38.64-38.43 |
| D | 36.04-35.81 |
| E | 31.6-31.49 |
| F | 30.63-30.51 |
| G | 17.71-17.49 |
| H | 17.31-17.10 |
| I | 27.74-27.54 |
| P | 34.92-34.73 |
| Q | 34.67-34.50 |
| R | 34.06-33.9 |
| S | 31.4-31.21 |
| T | 38.34-37.7 |
| U | 37.7-37.37 |
| V | 30.46-30.31 |
| W | 30.12-29.84 |
| X | 27.55-27.10 |
| Y | 24.94-24.26 |

Chemical shifts are given at +/−0.05 ppm.

The main peak A is indicative of 1.2 PP units.

Peak I is indicative of 1.3 PP units.

Peaks B, C, D, E, F, G, H are indicative of 2.1 PP units.

Peaks T, U, V, W, X, Y are indicative of ethylene incorporation in 1.2 PP unit

Peaks P, Q, R, S are indicative of ethylene incorporation after 2.1 PP unit

The % by weight of the $C_2$ content is obtained by the following areas (A) combination $$A_{C3\ 1,2}=A_A$$

$$A_{C3\ 2,1}=(A_B+A_C+A_D+A_E+A_F+A_G+A_H)/7+(0.5*A_P+0.5*A_Q+0.5*A_S)/3$$

$$A_{C3\ 1,3}=A_I/2$$

$$A_{C2\ E1\ 1,2}=(0.5*A_T+A_Y)/2$$

$$A_{C2\ E2\ 1,2}=(A_U-A_I+A_X)/2-A_V$$

$$A_{C2\ E3\ 1,2}=((A_U-A_I+A_T)*0.5+(A_X-A_V)*0.5+A_V+A_W+A_X+A_Y)/2-A_{C2\ E1\ 1,2}-A_{C2\ E2\ 1,2}$$

$$A_{C2\ 2,1}=(0.5*A_P+0.5*A_Q+0.5*A_S+A_R)/4$$

$$A_{C2}=(A_{C2\ E1\ 1,2}+A_{C2\ E2\ 1,2}+A_{C2\ E3\ 1,2}+A_{C2\ 2,1})$$

$$A_{C3}=(A_{C3\ 1,2}+A_{C3\ 2,1}+A_{C3\ 1,3})$$

$$\%\ (wt.)\ C2=(28*A_{C2})/(28*A_{C2}+42*A_{C3})\times 100$$

$$Randomness\ (\%)=A_{C2\ E1\ 1,2}/A_{C2}$$

Determination of Al and Zr Contents

The Al and Zr contents were determined using inductively coupled plasma atomic emission spectroscopy (ICP-AES) after mineralization of the sample and recovery of the residues in an acid medium. The spectrometer used was ICP-AES ARCOS, by Spectro.

The determination of the elements was carried out by nebulization of the solution in an argon plasma, measurement of the intensities of the most sensitive and interference-free emission lines and comparison of these intensities with those of calibration solutions (external calibration method).

Preparation of the test solution: Under an inert atmosphere (in a glove box), about 0.3 g of catalyst were added into a platinum crucible and 3 to 5 ml of isopropyl alcohol were added to "deactivate" the catalyst. The mixture was heated to dryness in a sand bath (30 minutes). The platinum crucible was placed in an oven at 600 °C for 10 minutes. After cooling, Milli-Q® deionized water was added to impregnate all the ashes, and 1 ml of concentrated HCl and concentrated HF were added. The crucible was placed in a sand bath, and Milli-Q® deionized water was added to mix the content of the crucible. After 24 hours, 1 ml of concentrated HCl, 0.5 ml of concentrated HF and Milli-Q® deionized water were added while agitating the mixture under heat to achieve full dissolution. After cooling the mixture was transferred to a 50 ml polypropylene tube and the volume made up to 50 ml with Milli-Q® deionized water. The test solutions were then diluted 25 times ensuring that 2% HCl/HF 1% medium was maintained.

Preparation of calibration standards and control solutions: Standard solutions were prepared by dilution of commercial single-element solutions of certified concentrations. The standard solutions were prepared by transferring the required volume of the certified solution to a 50 ml polypropylene tube, then rinsing the sides of the tube with Milli-Q® deionized water, and adding 1 ml of HCl and 0.5 ml of concentrated HF per 50 ml to obtain the same acid content in solution as in the sample solutions, and finalizing the dilution with Milli-Q® deionized water. Control solutions were prepared by dilution of commercial multi-element solutions of certified concentrations. The presence of other elements in solution allowed verification of the presence/absence of possible interferences.

Expression of Results

The content (in ppm) of the element measured in the sample was calculated as follows:

Concentration in mg/l of the element in solution×Volume (50 ml)×Dilution factor/Mass (g)

The Limit of Quantification (LOQ) was calculated for each element from 10 blank measurements:

LOQ in solution (mg/l)=standard deviation of 10 replicates of the blank×10

LOQ in sample (ppm)=LQ in solution×Volume (50 ml)×Dilution factor/Mass (g).

A. Catalysts
Catalyst 1:
Metallocene catalyst 1 (Cata 1) was prepared as described below and shown under Scheme 1.
Scheme 1
a) Synthesis of substituted cyclopentadiene
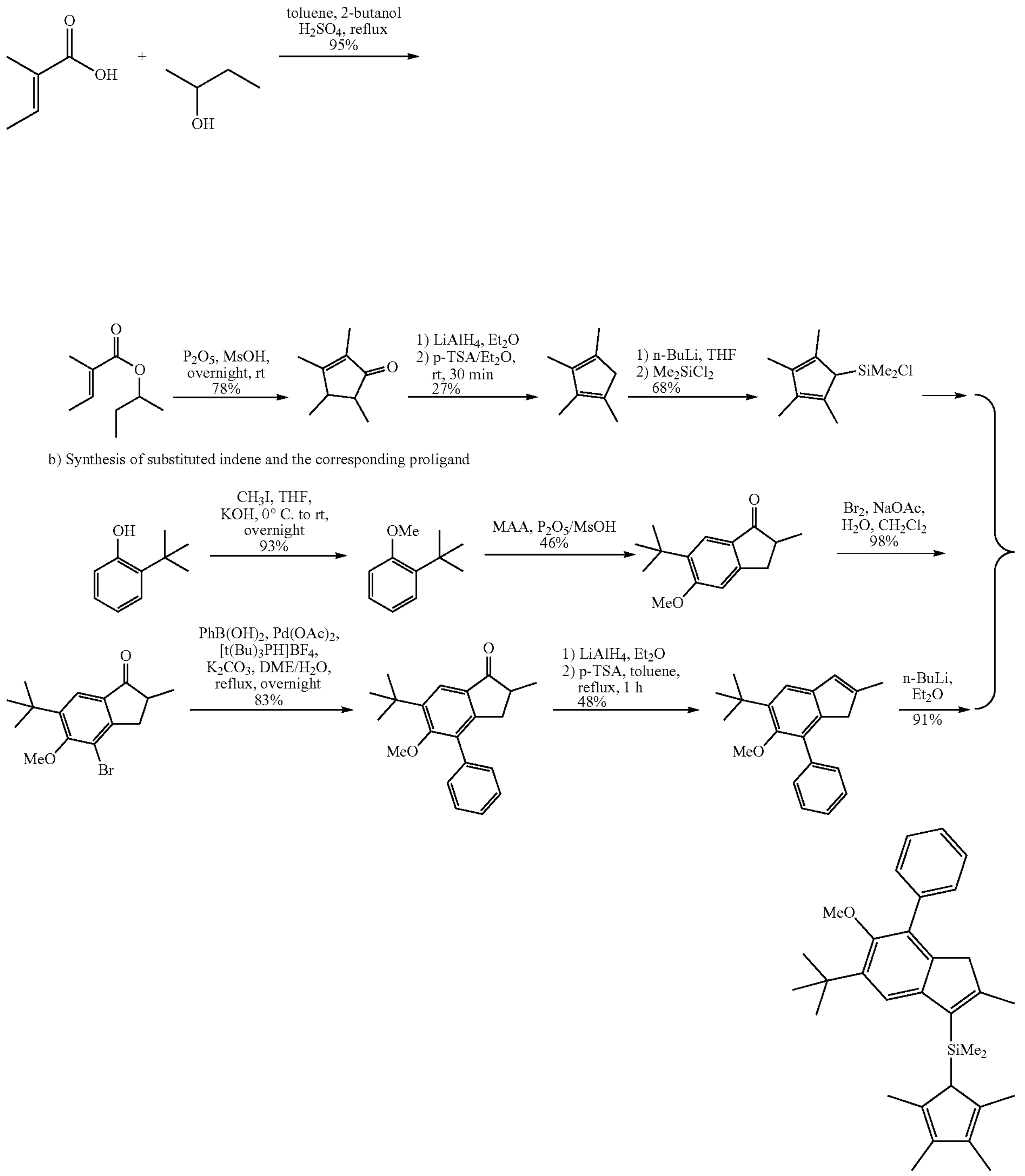

c) Synthesis of metallocene

-continued

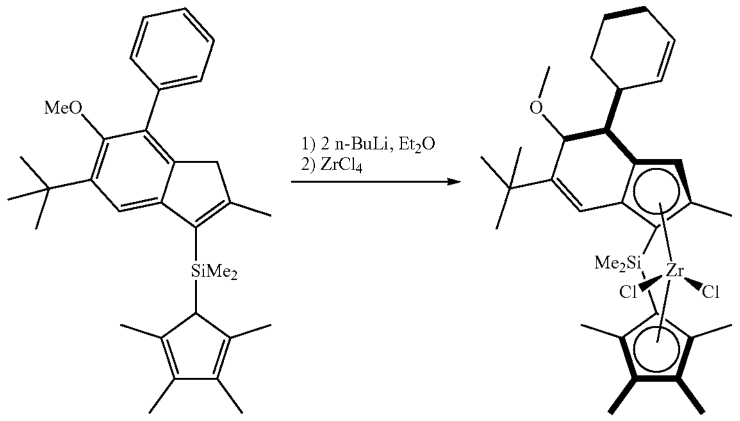

$C^{OMe,tBu}$-Zr (50%)

2-Tert-butyl anisole: A solution of 2-butylphenol (20.0 g, 0.13 mol) in THF (8.3 mL) was slowly added to a suspension of freshly powdered KOH (26.15 g, 0.47 mol) in THF (17 mL) while keeping the temperature below 10 °C; the resulting mixture was then stirred for 3 h at room temperature. Subsequently, $CH_3I$ (56.7 g, 0.40 mol) was added dropwise at 0 °C and the reaction mixture was stirred overnight at room temperature. Then it was filtered and concentrated to obtain a pale-yellow liquid which was dried under vacuum (20.2 g, 93%). $^1H$ NMR (400 MHz, $CDCl_3$, 25 °C): δ 7.40 (dd, J=7.7, 1.5, 1H, o-(OMe)Ph), 7.29 (td, J=8.0, 1.6, 1H, o-(tBu)Ph), 7.00 (td, J=8.3, 3.2, 2H, m-Ph), 3.93 (s, 3H, $OCH_3$), 1.50 (s, 9H, $CH_3$).

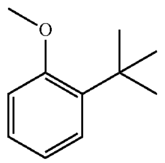

6-Tert-butyl-5-methoxy-2-methyl-1-indanone: A mixture of 2-tert-butylanisole (17.8 g, 0.11 mol) and methacrylic acid (11.7 g, 0.14 mol) was added dropwise at 60 °C to a well stirred Eaton reagent prepared from $P_2O_5$ (31.0 g, 0.22 mol) in methanesulfonic acid (156.0 mL, 2.4 mol). The resulting mixture was stirred for 1 h at 60 °C and subsequently overnight at room temperature. Then it was poured into ice water (400 mL) and extracted with toluene (2×200 mL). The combined organic layers were washed with water and an aqueous solution of $NaHCO_3$ (1.0 M, 200 mL), dried over $MgSO_4$, evaporated and distilled at 145-150 °C at 0.7 Torr (93.3257 Pa) (11.6 g, 46%). $^1H$ NMR (400 MHz, $CDCl_3$, 25 °C): δ 7.70 (s, 1H, t-Bu-Ph), 6.92-6.87 (m, 1H, OMe-Ph), 3.94 (d, J=2.8, 3H, $CH_3$—O), 3.38-3.29 (m, 1H, 2-ind), 2.75-2.62 (m, 2H, 3-ind), 1.39 (s, 9H, t-Bu), 1.31 (dd, J=7.4, 2.5, 3H, 2-$CH_3$-ind).

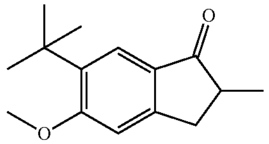 [SMILES: COc1cc2c(cc1C(C)(C)C)C(=O)C(C)C2]

4-Bromo-6-tert-butyl-5-methoxy-2-methyl-1-indanone: Bromine (5.95 mL, 0.12 mol) was added dropwise at 0 °C to a mixture of 6-tert-butyl-5-methoxy-2-methyl-1-indanone (27.0 g, 0.12 mol), NaOAc (28.6 g, 0.35 mol), tetrabutylammonium bromide (0.75 g, 2% mol) in $CH_2Cl_2$ (30 mL) with water (90 mL). It was then stirred overnight at room temperature. After 16 h, bromine (3.4 mL, 0.066 mol) was added as well as NaOAc (16.2 g, 0.2 mol) and the mixture was stirred for 6 h at rt. The organic phase was separated, washed with an aqueous solution of $Na_2S_2O_3$ (1.0 M, 300 mL), 5% saturated aqueous solution of $NaHCO_3$ and water. After it was dried over $MgSO_4$ and evaporated to give the desired compound as a viscous orange oil (35.3 g, 98%). $^1H$ NMR (400 MHz, $CDCl_3$, 25 °C): δ 7.69 (s, 1H, Ph), 4.02 (s, 3H, OMe), 3.34-3.25 (m, 1H, 2H-ind), 2.77-2.57 (m, 2H, 3H-ind), 1.39 (s, 9H, t-Bu-Ph), 1.31 (dd, J=7.5, 1.6, 3H, 2-$CH_3$-ind).

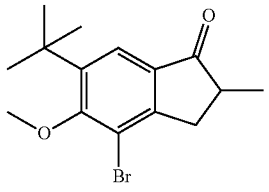 [SMILES: COc1c(C(C)(C)C)cc2c(c1Br)CC(C)C2=O]

6-(Tert-butyl)-5-methoxy-2-methyl-4-phenyl-1-indanone: $Pd(OAc)_2$ (0.11 g, 3% mol) and $[(tBu)_3PH]BF_4$ (0.29 g, 6% mol) were added under argon flush to a well-stirred mixture of 4-bromo-6-(tert-butyl)-5-methoxy-2-methyl-1-indanone (5.1 g, 0.017 mol), phenyl boronic acid (2.82 g, 0.023 mol), $K_2CO_3$ (6.39 g, 0.046 mol) in 1,2-dimethoxyethane (60 mL) and water (20 mL). The reaction mixture was refluxed overnight. Then the reaction mixture was poured into water (200 mL) and extracted with $CH_2Cl_2$ (3×100 ml). The combined organic phases were washed with water and an aqueous solution of $Na_2CO_3$ (2.0 M, 100 mL), dried over $MgSO_4$ and evaporated under reduced pressure to afford orange liquid (5.3 g, 83%). $^1$H NMR (400 MHz, $CDCl_3$, 25 °C): δ 7.76 (s, 1H, o-(t-Bu)-Ph), 7.51-7.39 (m, 5H, 4-Ph-ind), 3.29 (s, 3H, OMe), 3.14 (ddd, J=17.4, 7.9, 5.5, 1H, 2-Me-ind), 2.64 (dd, J=11.4, 7.5, 3.8, 1H, 3H-ind), 2.48 (ddd, J=17.4, 11.6, 4.0, 1H, 2H-ind), 1.43 (s, 9H, t-Bu), 1.25 (dd, J=7.4, 1.7, $CH_3$, 2-Me-ind).

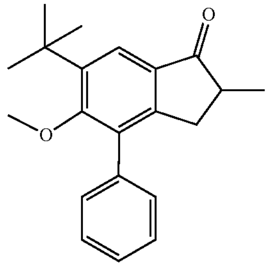 [SMILES: COc1c(C(C)(C)C)cc2c(c1-c1ccccc1)CC(C)C2=O]

6-Tert-butyl-5-methoxy-4-phenyl-2-phenyl-1H-indene: 6-(Tert-butyl)-5-methoxy-2-methyl-4-phenyl-1-indanone (6.3 g, 0.0204 mol) was dissolved in $Et_2O$ (40 mL) and added dropwise at 0 °C to a mixture of $LiAlH_4$ (0.39 g, 0.010 mmol) in $Et_2O$ (50 mL). After 1 hour of stirring, water (50 mL) and 5% w/v aqueous HCl (10 mL) was added and the organic phase was separated, washed with an aqueous solution of $Na_2CO_3$ (2.0 M, 200 mL), dried over $MgSO_4$ and evaporated. The residue was dissolved in toluene (60 mL), p-TSA (0.28 g, 9% mol) was added and the resulting mixture was refluxed for 30 min, cooled, washed with water, dried over $MgSO_4$ and evaporated. A brown oil was obtained which was purified by flash column chromatography ($Al_2O_3$-petroleum ether) to afford the desired product as a colorless viscous oil (2.8 g, 48%). $^1$H NMR (400 MHz, $CDCl_3$, 25 °C): δ 7.51-7.41 (m, 4H, 4-Ph-ind), 7.38-7.31 (m, 1H, o-(t-Bu)Ph), 7.22 (s, 1H, 4-Ph-ind), 6.46-6.31 (m, 1H, 1H-ind), 3.22 (s, 3H, OMe), 3.13 (s, 2H, 2H-ind), 2.10-2.04 (m, 3H, 2($CH_3$)-ind), 1.44 (s, 9H, t-Bu).

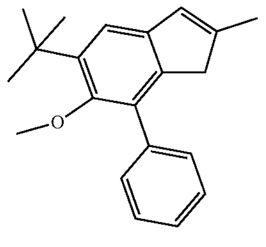 [SMILES: COc1c(C(C)(C)C)cc2c(c1-c1ccccc1)CC(C)=C2]

(1,2,3,4-Tetramethyl-1,3-cyclopentadienyl)-(2-methyl-4-phenyl-5-methoxy-6-tert-butyl-indenyl)-dimethylsilane (proligand $C^{OMe,tBu}$): 6-Tert-butyl-5-methoxy-4-phenyl-2-methyl-1H-indene (0.62 g, 0.0021 mol) was dissolved in dry $Et_2O$ (20 mL) and cooled down at −78 °C. To this solution, n-BuLi (0.93 mL of a 2.26 M solution in hexane, 0.0021 mol) was added by syringe and the temperature was raised to room temperature. The color of the solution changed from colorless to orange and the product precipitated as a yellow solid. The resulting mixture was stirred overnight. CuCN (0.076 g, 0.00084 mol) was added in at −25 °C. After 10 min of stirring, 5-(chlorodimethylsilyl)-1,2,3,4-tetramethyl-1,3-cyclopentadiene (0.45 g, 0.0021 mol, 1 equiv) was added dropwise at the same temperature and the resulting mixture was allowed to warm at room temperature and stirred overnight. The mixture was poured into water (30 mL), the organic layer was separated, and the aqueous layer was extracted with $Et_2O$ (2×30 mL). The combined organic phases were dried over $Na_2SO_4$ and then evaporated to dryness to give a yellow viscous oil (0.90 g, 91%) which was used without further purification. $^1$H NMR (300 MHz, $CDCl_3$, 25 °C): δ 7.53-7.30 (m, 5H, 4-Ph-ind), 6.41 (t, J=1.5, 1H, 3H-ind), 3.58 (s, 1H, 1H-ind), 3.23 (s, 3H), 2.16 (d, J=1.3, 3H), 1.99 (d, J=7.7, 9H), 1.87-1.77 (m, 10H), 1.44 (s, 11H, tBu), −0.24 (d, J=3.2, 6H, Si—$CH_3$).

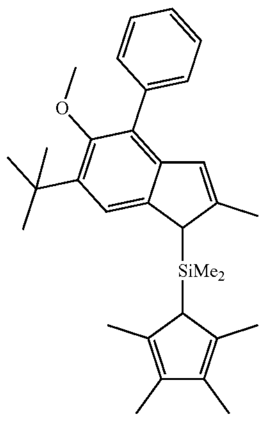

Cata 1: $C^{OMe,tBu}$—$ZrCl_2$ (1,2,3,4-Tetramethyl-1,3-cyclopentadienyl)-(2-methyl-4-phenyl-5-methoxy-6-tert-butyl-indenyl)-dimethylsilane-dichlorozirconium-(IV): n-BuLi (2.30 ml of a 2.26 M solution in hexanes, 0.0052 mol) was added dropwise to a solution of proligand $C^{OMe, tBu}$ (1.00 g, 0.0026 mol) in $Et_2O$ (30 mL) at −78 °C and the resulting mixture was stirred overnight. To this solution, $ZrCl_4$ (0.61 g, 0.0026 mol, 1 equiv) was added in at −78 °C and the resulting mixture was allowed to warm at room temperature and stirred overnight. The mixture was evaporated to dryness, dichloromethane/heptane (40 mL, 1:1 v/v) was added and the precipitated LiCl was filtered via cannula to give an orange solution. The latter was concentrated to ca. ⅓ v and the yellow microcrystalline powder which formed was separated via cannula filtration from the solution and then dried under vacuum (0.60 g, 50%). $^1$H NMR (400 MHz, $CD_2Cl_2$, 25 °C): δ 7.64 (s, 2H), 7.46 (q, J=7.4, 6.3, 4H), 7.41-7.32 (m, 1H), 6.59 (s, 1H, H of Cp ring), 3.34 (s, 3H, OMe-ind), 2.20 (s, 3H, C—$CH_3$), 2.05 (s, 3H, Cp-$CH_3$), 1.99 (s, 3H, Cp-$CH_3$), 1.90 (d, J=5.5, 6H, Cp-$CH_3$), 1.20 (s, 3H, Si—$CH_3$), 1.09 (s, 3H, Si—$CH_3$). $^{13}$C NMR (400 MHz, $CD_2Cl_2$, 25 °C): δ 159.24, 143.04, 137.26, 135.22, 135.06, 134.56, 129.77, 128.40, 127.44, 127.20, 126.28, 121.86, 121.41, 119.70, 93.88, 82.60, 62.29, 35.60, 30.09, 17.89, 15.83, 15.33, 12.26, 11.91, 2.77. piASAP calculated for $C_{32}H_{40}Cl_2OSiZr$ 628.1273, found m/z 630.1266.

Cata 1
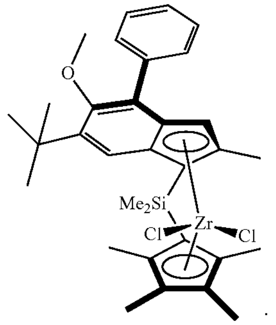
Comparative Example 1C
Comparative catalyst 1C (Comp 1C) was prepared as described below and shown under Scheme 2.
Scheme 2
a) Synthesis of substituted indene and the corresponding proligand
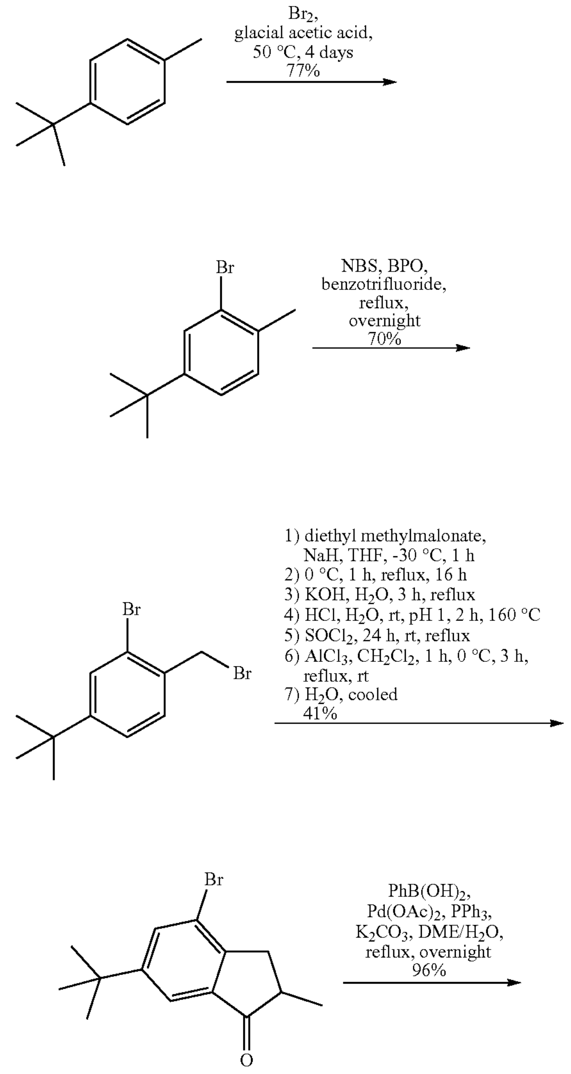
-continued
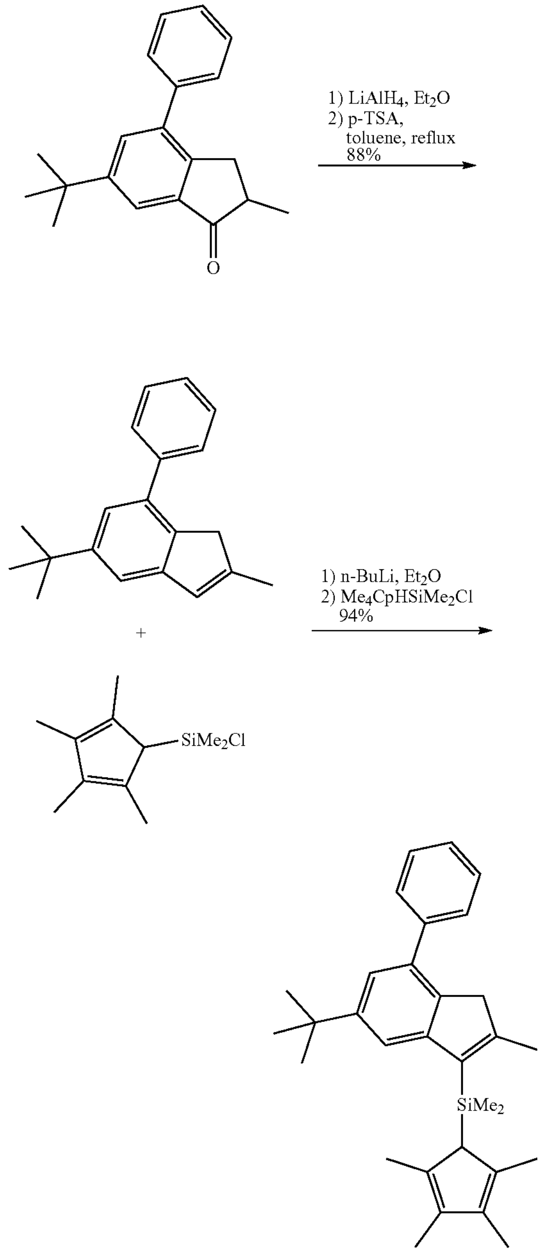
c) Synthesis of metallocene
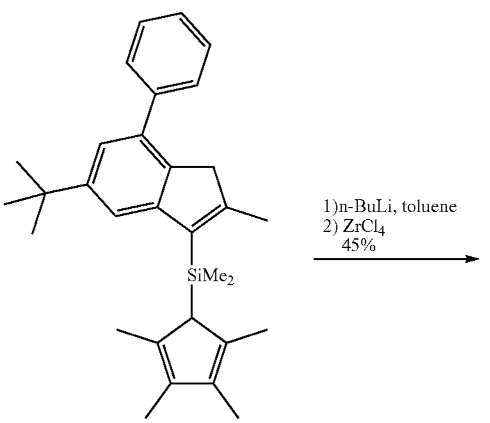

-continued

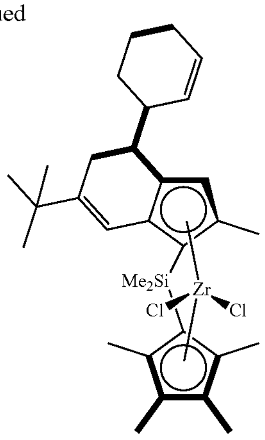

2-Bromo-4-tert-butyltoluene: Bromine (8.3 mL, 0.16 mol) was slowly added to a solution of 4-tert-butyltoluene (20.0 g, 0.14 mol) in glacial acetic acid (62 mL) at room temperature and the solution was then stirred at 50 °C for 4 days. The reaction mixture was allowed to cool at room temperature, then water (200 mL) and an aqueous solution of $Na_2S_2O_3$ (1.0 M, 200 mL)) were added. The aqueous phase was extracted with $Et_2O$ (2×250 mL). The combined organic phases were washed with water, dried over $Na_2SO_4$, evaporated, and distilled (90 °C/0.05 mbar) to obtain the desired compound as a yellow liquid (24.4 g, 77%). $^1H$ NMR (300 MHz, $CDCl_3$, 25 °C): δ 7.26 (s, 1H, o-PhBr), 6.94 (dd, J=7.9, 2.0, 1H, o-Ph(t-Bu)), 6.87 (d, J=8.0, 1H, m-Ph(t-Bu)), 2.08 (s, 3H, $CH_3$), 1.02 (s, 9H, t-Bu).

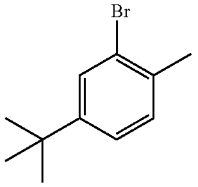

2-Bromo-4-tert-butylbenzene bromide: A magnetically stirred mixture of 2-bromo-4-tert-butyltoluene (14.0 g, 0.062 mol), N-bromosuccinimide (11.0 g, 0.062 mol), benzoyl peroxide (45.0 mg, 0.0002 mol) in α,α,α-trifluorotoluene (90 mL) was refluxed overnight. The mixture was cooled and the formed succinimide was removed by filtration. The filtrate was rotary evaporated and distilled (0.06 mbar, 75-84 °C) to obtain yellow liquid (13.1 g, 70%). $^1H$ NMR (300 MHz, $CDCl_3$, 25 °C): δ 7.58 (d, J=1.9, 1H, o-PhBr), 7.39 (d, J=8.1, 1H, o-Ph(t-Bu)), 7.32 (dd, J=8.1, 1.9, 1H, m-Ph(t-Bu)), 4.60 (s, 2H, allylic-$H_2$), 1.31 (d, J=2.5, 9H, t-Bu).

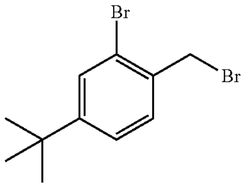

2-(2-Bromo-4-tert-butylbenzyl)-2-methylmalonate: Diethyl-2-methylmalonate (5.42 g, 0.031 mol) was slowly added to a suspension made of NaH (0.821 g, 0.034 mol) dispersed in dry THF (40 mL) at −30 °C and then stirred for 1 h. 2-Bromo-4-tert-butylbenzene bromide (10.0 g, 0.0327 mol) dissolved in dry THF (10 mL) was added at 0 °C, stirred for 1 h and then under reflux for 16 h. Precipitated NaBr was filtered on silica and the filtrate was concentrated to give a yellow oil (12.0 g, 96%). $^1H$ NMR (300 MHz, $CDCl_3$, 25 °C): δ 7.52 (d, J=2.0, 1H, o-PhBr), 7.20 (dd, J=8.1, 2.1, 1H, Ph(t-Bu)), 7.07 (d, J=8.1, 1H, Ph(Me-malonate)), 4.21 (qd, J=7.1, 1.9, 4H, $OCH_2$), 3.47 (s, 2H, CH), 1.38 (s, 3H, $CH_3$), 1.33-1.21 (m, 15H, $(CH_3)_3$, O—$CH_3$).

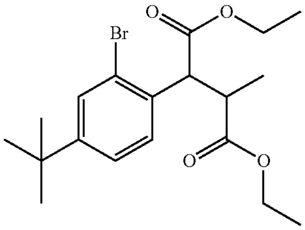 [SMILES: CCOC(=O)C(C)C(C(=O)OCC)c1ccc(C(C)(C)C)cc1Br]

3-(2-Bromo-4-tert-butylbenzyl)-2-methylmalonic acid: 2-(2-Bromo-4-tert-butylbenzyl)-2-methylmalonate (12.0 g, 0.03 mol) was added with $H_2O$/MeOH (70 mL, 1:1 v/v) and NaOH (4.80 g, 0.12 mol) and the resulting mixture was heated under reflux overnight. Then, $H_2O$ (30 mL) and 12 M HCl to pH 1 were added to the reaction mixture to precipitate an orange viscous oil. The latter oil was dissolved in $CH_2Cl_2$ (100 mL) and washed with water. A white solid started precipitating from the solution. After evaporation of the solvent, petroleum ether (150 mL) was added to precipitate a white solid (5.6 g, 55%). $^1H$ NMR (300 MHz, THF-$d_8$, 25 °C): δ 7.56 (t, J=1.1, 1H, o-PhBr), 7.24 (d, J=1.1, 2H, Ph), 3.43 (s, 2H, CH), 1.27 (m, J=3.6, 12H, $(CH_3)_3$, $CH_3$).

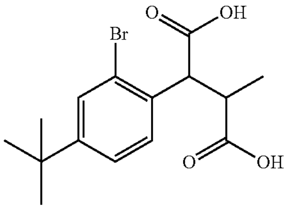 [SMILES: CC(C(=O)O)C(C(=O)O)c1ccc(C(C)(C)C)cc1Br]

3-(2-Bromo-4-tert-butylphenyl)-2-methylpropanoic acid: 3-(2-Bromo-4-tert-butylbenzyl)-2-methylmalonic acid was heated under reflux in air at 160 °C for 4 h to yield a highly viscous yellow oil (4.88 g, 99%). $^1H$ NMR (300 MHz, THF-$d_8$, 25 °C): δ 7.55 (d, J=2.0, 1H, o-PhBr), 7.27 (dd, J=8.0, 2.0, 1H, Ph), 7.19 (d, J=8.1, 1H, Ph), 3.18-3.03 (m, 1H, CH), 2.84-2.64 (m, 2H, allylic $CH_2$), 1.28 (s, 9H, $(CH_3)_3$), 1.16-1.07 (m, 3H, $CH_3$).

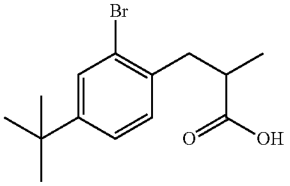 [SMILES: CC(Cc1ccc(C(C)(C)C)cc1Br)C(=O)O]

3-(2-Bromo-4-tert-butylphenyl)-2-methylpropanoyl chloride: 3-(2-Bromo-4-tert-butylphenyl)-2-methylpropanoic acid (4.88 g, 0.016 mol) was dissolved in $CH_2Cl_2$ (5 mL) and subsequently thionyl chloride (5.82 g, 0.049 mol) was added dropwise at 0 °C. After complete addition, the resulting solution was stirred under reflux at 40 °C overnight. Excess thionyl chloride was removed under vacuum to leave a yellow liquid which was dried under vacuum overnight (5.0 g, 96%). $^1H$ NMR (300 MHz, $CDCl_3$, 25 °C): δ 7.56 (d, J=2.0, 1H, o-PhBr), 7.30-7.23 (m, 1H, Ph), 7.15 (d, J=8.0, 1H, Ph), 3.40-3.20 (m, 2H, $CH_2$), 2.91-2.75 (m, 1H, CH), 1.40-1.25 (m, 12H, $(CH_3)_3$, $CH_3$).

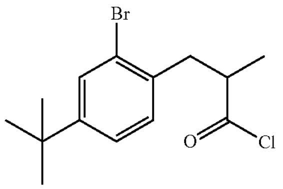 [SMILES: CC(Cc1ccc(C(C)(C)C)cc1Br)C(=O)Cl]

4-Bromo-6-tert-butyl-2-methyl-1-indanone: A solution of 3-(2-Bromo-4-tert-butylphenyl)-2-methylpropanoyl chloride (4.95 g, 0.016 mol) in $CH_2Cl_2$ (20 mL) was slowly added dropwise at 0 °C for 30 min to a suspension in which $AlCl_3$ (2.52 g, 0.19 mol) was dispersed in $CH_2Cl_2$ (20 mL). The resulting mixture was heated and stirred at reflux for 3 h, cooled at room temperature and poured into ice water (150 mL). The organic layer was separated, and the aqueous phase was extracted with $Et_2O$ (3×100 mL). The combined extract was dried over $K_2CO_3$ and after over $Na_2SO_4$ and evaporated to dryness to obtain a yellow solid (3.54 g, 80%). $^1H$ NMR (300 MHz, $CDCl_3$, 25 °C): δ 7.80 (d, J=1.7, 1H, o-PhBr), 7.72 (d, J=1.7, 1H, Ph), 3.31 (dd, J=17.5, 7.8, 1H, 2-($CH_3$)-ind), 2.84-2.53 (m, 2H, 3H-ind), 1.32 (m, J=6.3, 12H, $(CH_3)_3$, $CH_3$).

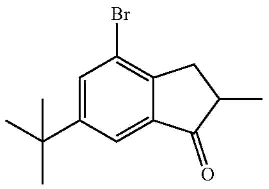 [SMILES: CC1Cc2c(Br)cc(C(C)(C)C)cc2C1=O]

4-Phenyl-6-tert-butyl-2-methyl-1-indanone: $Pd(OAc)_2$ (0.085 g, 3% mol) and $PPh_3$ (0.20 g, 6% mol) were added under Ar flush to a well-stirred mixture of 4-Bromo-6-tert-butyl-2-methyl-1-indanone (3.54 g, 0.013 mol), $PhB(OH)_2$ (2.15 g, 0.018 mol), $K_2CO_3$ (4.90 g, 0.035 mol) in 1,2-dimethoxyethane (42 mL) and water (14 mL). Then it was poured into water (200 mL) and extracted with $CH_2Cl_2$ (3×100 ml). The combined organic phases were washed with water and an aqueous solution of $Na_2CO_3$ (2M, 100 mL), dried over $Na_2SO_4$ and evaporated. The crude product was extracted with hexane (200 mL) and evaporation of volatiles under vacuum afforded a viscous red oil (3.40 g, 96%). $^1H$ NMR (300 MHz, $CDCl_3$, 25 °C): δ 7.80 (d, J=1.9, 1H, o-Ph-ind), 7.66 (d, J=1.9, 1H, o-tBu-Ph), 7.50-7.46 (m, 5H, 4-Ph-ind), 3.46-3.31 (m, 1H, 2H-ind), 2.80-2.65 (m, 2H, 3H-ind), 1.39 (s, 9H, $(CH_3)_3$), 1.31 (d, J=7.2, 3H, $CH_3$).

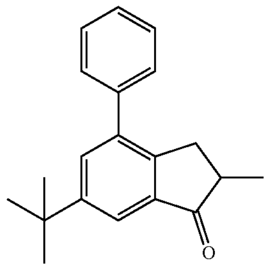 [SMILES: CC1Cc2c(cc(C(C)(C)C)cc2-c2ccccc2)C1=O]

4-Phenyl-6-tert-butyl-2-methyl-1H-indene: 4-Phenyl-6-tert-butyl-2-methyl-1-indanone (3.40 g, 0.012 mol) was dissolved in $Et_2O$ (20 mL) and added dropwise at 0 °C to $LiAlH_4$ (0.23 g, 0.0061 mol) in $Et_2O$ (50 mL). After 1 h of stirring, water (40 mL) and 5% w/v aqueous HCl (10 mL) was added and the organic phase was separated, washed with an aqueous solution of $Na_2CO_3$ (2.0 M, 100 mL), dried over $MgSO_4$ and evaporated. The residue was dissolved in toluene (50 mL), p-TSA (0.21 g, 9% mol) was added and the resulting mixture was refluxed for 20 min, cooled down, washed with water, dried over $Na_2SO_4$ and evaporated to obtain a brown oil, which was crystallized at 0 °C (2.80 g, 88%). $^1H$ NMR (300 MHz, $CDCl_3$, 25 °C): δ 7.60-7.53 (m, 2H), 7.52-7.42 (m, 3H), 7.41-7.31 (m, 2H), 6.54 (br, s, J=1.6, 1H, 1H-ind), 3.36 (dd, J=1.6, 0.8, 2H, 2H-ind), 2.18-2.11 (m, 3H, $CH_3$), 1.40 (s, 9H, $(CH_3)_3$).

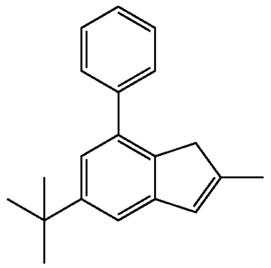 [SMILES: CC1=Cc2cc(C(C)(C)C)cc(-c3ccccc3)c2C1]

(1,2,3,4-Tetramethyl-1,3-cyclopentadienyl)-(2-methyl-4-phenyl-6-tert-butyl-indenyl)-dimethylsilane (proligand $C^{tBu}$): 6-Tert-butyl-4-phenyl-2-methyl-1H-indene (2.40 g, 0.0092 mol) was dissolved in dry $Et_2O$ (40 mL) and cooled down at −78 °C. To this solution, n-BuLi (4.05 mL of a 2.26 M solution in hexane, 0.0092 mol) was added by syringe and the temperature was raised to room temperature. The resulting mixture was stirred overnight. Then Conch (0.33 g, 0.0037 mol) was added in at −25 °C. After 10 min of stirring, 5-(chlorodimethylsilyl)-1,2,3,4-tetramethyl-1,3-cyclopentadiene (1.67 g, 0.0092 mol) was added dropwise at the same temperature and the resulting mixture was allowed to warm at room temperature and stirred overnight. The mixture was poured into water (50 mL), the organic layer was separated, and the aqueous layer was extracted with ether (2×50 mL). The combined organic phases were dried over $Na_2SO_4$ and then evaporated to dryness to give a yellow viscous oil (3.80 g, 94%) which was used without further purification. $^1H$ NMR (300 MHz, $CDCl_3$, 25 °C): δ 7.65-7.20 (m, 9H), 6.78-6.67 (m, 1H, 3H-ind), 3.67 (d, J=3.5, 1H, 1H-ind), 3.24 (s, 1H), 2.22 (s, 4H), 2.01 (d, J=13.0, 8H), 1.89-1.75 (m, 8H), 1.38 (d, J=4.1, 11H), −0.26 (dd, J=11.2, 2.4, 6H, Si—$CH_3$).

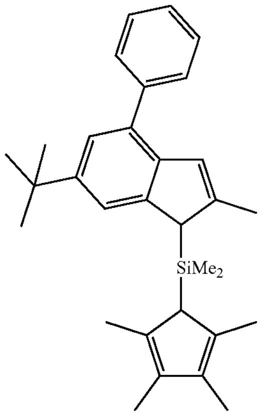

Comp 1C: $C^{tBu}$—$ZrCl_2$ (1,2,3,4-Tetramethyl-1,3-cyclopentadienyl)-(2-methyl-4-phenyl-6-tert-butyl-indenyl)-dimethylsilane-dichlorozirconium-(IV): n-BuLi (2.00 ml of a 2.26 M solution in hexanes, 0.0045 mol) was added dropwise to a solution of proligand $C^{tBu}$ (1.00 g, 0.0023 mol) in $Et_2O$ (15 mL) at −78 °C and the resulting mixture was stirred overnight. To this solution, $ZrCl_4$ (0.53 g, 0.0023 mol) was added in at −80 °C and the resulting mixture was allowed to warm at room temperature and stirred overnight. The mixture was evaporated to dryness, dichloromethane/heptane (40 mL, 1:1 v/v) was added and the precipitated LiCl was filtered via cannula to give orange solution. The latter was concentrated to ca. ⅓ v and the yellow microcrystalline powder which formed was separated via cannula filtration from the solution and then dried under vacuum (0.62 g, 45%). $^1H$ NMR (400 MHz, $CD_2Cl_2$, 25 °C): δ 7.68 (d, J=7.6, 2H), 7.54-7.43 (m, 4H), 7.40 (d, J=7.2, 2H), 6.94 (s, 1H, H of Cp ring), 2.28 (s, 3H, C—$CH_3$), 2.07 (s, 3H, Me-Cp), 2.00 (s, 3H, Me-Cp), 1.91 (d, J=14.9, 6H, Me-Cp), 1.31 (s, 10H, tBu), (1.24 (s, 3H), 1.11 (s, 3H), Si—$CH_3$). $^{13}C$ NMR (400 MHz, $CD_2Cl_2$, 25 °C): δ 147.66, 140.26, 137.42, 137.08, 134.78, 134.60, 131.60, 128.61, 128.48, 127.53, 127.48, 126.53, 125.78, 120.41, 118.99, 94.15, 83.19, 34.93, 30.51, 17.90, 15.93, 15.35, 12.24, 11.94, 2.89, 2.86. piASAP calculated for $C_{31}H_{38}Cl_2SiZr$ 598.1167, found m/z 600.1155.

Comp 1C

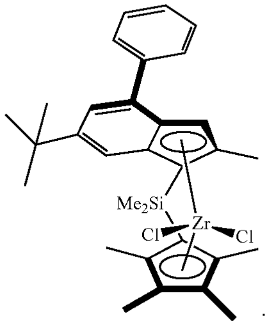

Comparative Example 2C

Comparative catalyst 2C (Comp 2C) was prepared as described below:

2-Methyl-4-phenylindene: Phenyl boronic acid (3.27 g, 0.027 mol) was dissolved in DME/$H_2O$ (64.0 mL, 3:1 v/v) and transferred to a Schlenk flask where subsequently 4-bromo-2-methyl-1H-indene (4.00 g, 0.019 mol) and $K_2CO_3$ (7.40 g, 0.054 mol) were added. The mixture was stirred and placed under Ar. Then, $Pd(OAc)_2$ (0.13 g, 3% mol) and $PPh_3$ (0.30 g, 6% mol) were added and the mixture was refluxed for 16 h. Then the reaction mixture was poured into water and extracted with $CH_2Cl_2$ (3×100 mL). The combined organic phases were washed with water (3×100 mL) and an aqueous solution of $Na_2CO_3$ (2M, 100 mL), dried over $MgSO_4$ and evaporated. The crude product was extracted with hot hexane (200 mL) to obtain after evaporation of volatiles an orange oil (3.53 g, 90%), which was purified by column chromatography (eluent system: 95:5 v/v Hexane/EtOAc) to give the desired compound as a colorless viscous liquid (2.60 g, 66%). $^1H$ NMR (300 MHz, $CDCl_3$, 25 °C): δ 7.55 (tt, J=6.4, 1.5, 2H, o-Ph), 7.51-7.42 (m, 2H, m-Ph), 7.42-7.33 (m, 2H, o-,m-Ph-indene), 7.33-7.24 (m, 1H, p-Ph), 7.24-7.13 (m, 1H, p-Ph-indene), 6.63 (ddq, J=39.7, 3.1, 1.6, 1H, 3H-indene), 3.40 (dq, J=2.8, 1.0, 2H, 1H-indene), 2.17 (dd, J=2.8, 1.5, 3H, $CH_3$).

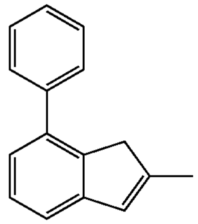 [SMILES: CC1=Cc2cccc(-c3ccccc3)c2C1]

(1,2,3,4-Tetramethyl-1,3-cyclopentadienyl)-(2-methyl-4-phenylindenyl)-dimethylsilane (pro-ligand $C^H$): 2-Methyl-4-phenylindene (4.30 g, 0.021 mol) was dissolved in dry $Et_2O$ (50 mL) and cooled down at −78 °C. To this solution, n-BuLi (9.2 mL of a 2.26 M solution in hexane, 0.021 mol, 1 equiv) was added by syringe and the temperature was raised to room temperature. The color of the solution changed from yellow to orange from the first drop of n-BuLi and the product precipitated as a yellow solid. The resulting mixture was stirred overnight. CuCN (0.75 g, 0.083 mol) was added in at −25 °C. After 10 min of stirring, 5-(chlorodimethylsilyl)-1,2,3,4-tetramethyl-1,3-cyclopentadiene (4.48 g, 0.021 mol, 1 equiv) was added dropwise at the same temperature and the resulting mixture was allowed to warm at room temperature and stirred overnight. The mixture was poured into water (100 mL), the organic layer was separated, and the aqueous layer was extracted with ether (2×70 mL). The combined organic phases were dried over $Na_2SO_4$ and then evaporated to dryness to give a yellow viscous oil (7.2 g, 90%) which was used without any purification.

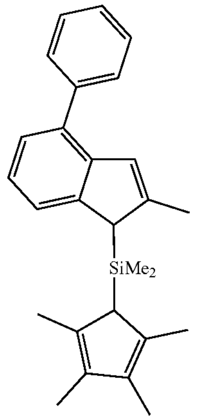

Comp 2C: $C^H$—$ZrCl_2$ (1,2,3,4-Tetramethyl-1,3-cyclopentadienyl)-(2-methyl-4-phenylindenyl)-dimethylsilane-dichlorozirconium-(IV): n-BuLi (2.30 ml of a 2.26 M solution in hexanes, 0.0052 mol) was added dropwise to a solution of pro-ligand $C^H$ (1.00 g, 0.0026 mol) in $Et_2O$ (30 mL) at −78 °C and the resulting mixture was stirred overnight. To this solution, $ZrCl_4$ (0.61 g, 0.0026 mol) was added in at −80 °C and the resulting mixture was allowed to warm at room temperature and stirred overnight. The mixture was evaporated to dryness, and dichloromethane/heptane (40 mL, 1:1 v/v) was added and the precipitated LiCl was filtered via cannula to give an orange solution. The latter was concentrated to ca. ⅓ v; a yellow microcrystalline powder formed which was separated via cannula filtration from the solution and then dried under vacuum (0.60 g, 42%). $^1H$ NMR (400 MHz, $CDCl_3$, 25 °C): δ 7.71-7.65 (m, 2H), 7.57 (d, J=8.7 Hz, 1H), 7.46 (t, J=7.5, 3H), 7.37 (t, J=7.4, 2H), 7.31 (s, 1H), 7.09-7.02 (m, 2H), 2.30 (s, 3H), 2.09 (s, 3H), 2.01 (s, 3H), 1.92 (d, J=10.2, 6H), 1.22 (s, 3H), 1.11 (s, 3H). $^{13}C$ NMR (500 MHz, $CD_2Cl_2$, 25 °C): δ 139.87, 137.85, 135.52, 134.61, 133.73, 128.62, 128.50, 128.31, 127.85, 127.61, 125.96, 125.67, 124.66, 94.49, 83.87, 18.03, 15.71, 15.44, 12.27, 11.89, 2.82, 2.73. piASAP calculated for $C_{27}H_{30}Cl_2SiZr$ 542.0541, found m/z 544.0535.

Comp 2C

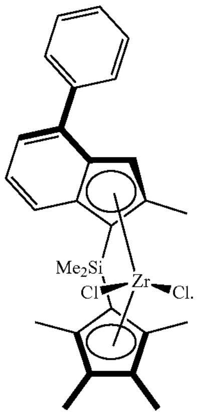

Catalyst 2:

Catalyst 2 (Cata 2) was prepared as described below and shown under Scheme 3.

Scheme 3

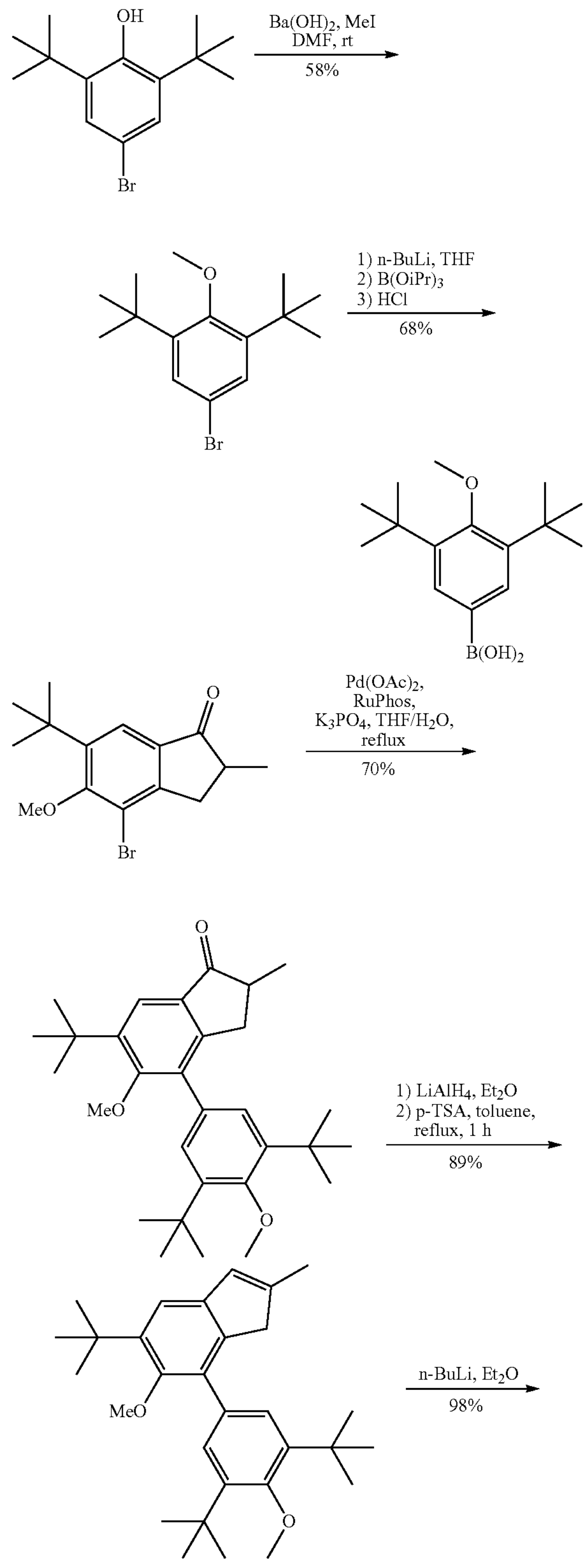

-continued

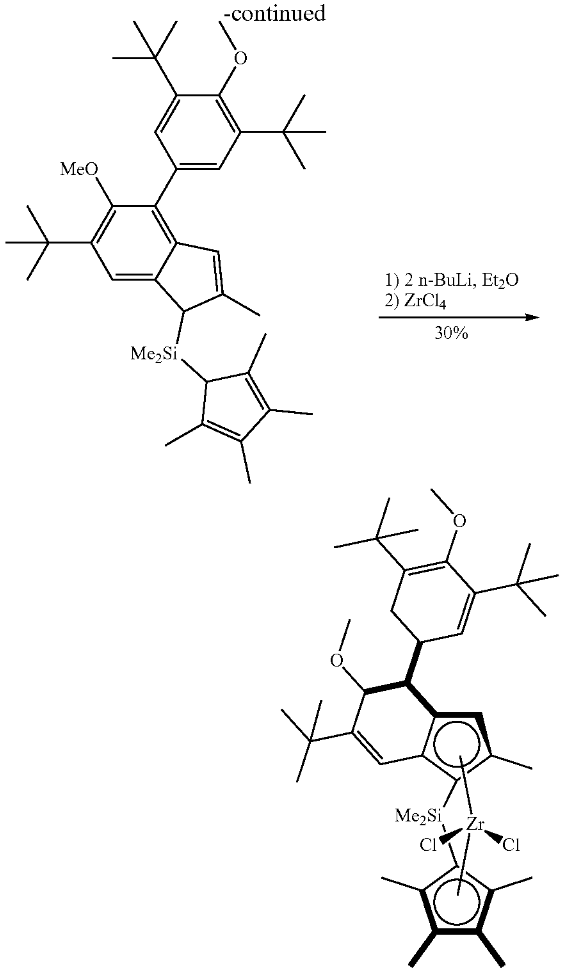

1,3-Di-tert-Butyl-2-methoxybenzene: Under an atmosphere of Ar, to 2,6-di-tert-butylphenol (50.0 g, 0.18 mol) in degassed dry DMF (300 mL) was successively added barite (74.0 g, 0.23 mol) and $CH_3I$ (36.0 mL, 0.58 mol). The reaction mixture was stirred overnight. $Et_2O$ (300 mL) was then added. The organic layer was extracted with $H_2O$ (500 mL), an aqueous solution of NaOH (1.0 M, 300 mL) and $H_2O$ (2×400 mL). The combined extracts were dried with $MgSO_4$ and concentrated in vacuum. The crude residue was purified by distillation (123 °C, 3 mbar) to obtain orange crystalline solid (30.0 g, 58%). $^1$H NMR (300 MHz, $CDCl_3$, 25 °C): δ 7.34 (s, 2H), 3.69 (s, 3H), 1.42 (s, 18H).

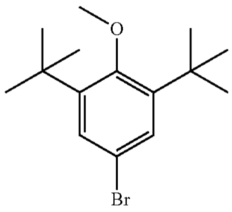 [SMILES: COc1c(C(C)(C)C)cc(Br)cc1C(C)(C)C]

3,5-Di-tert-butyl-4-methoxyphenyl)boronic acid: 4-Bromo-2,6-di-tert-butylanisole (30.0 g, 0.1 mol) was added to a three neck round bottom flask, which was flushed with nitrogen for 10 min. Anhydrous THF (400 mL) was added via cannula, the solution was cooled to −78 °C, and n-BuLi (48.0 mL of a 2.5 M solution in hexane, 0.12 mol, 1.2 equiv) was added dropwise by syringe. The solution was stirred for 1 hour at −78 °C. Then, $(iPrO)_3B$ (56.0 mL, 0.3 mol) was added slowly by syringe, and the reaction allowed to warm and stir overnight to give a milky yellow solution. Solid $NH_4Cl$ was added to the solution to quench excess n-BuLi then 1 M aqueous HCl was added dropwise to adjust the pH to 6.5, and finally 6M HCl to pH 1. The reaction layers were separated, and the aqueous layer was extracted with dichloromethane. The combined organic layers were reduced in volume under vacuum, and a yellow-white solid precipitated and diluted in dichloromethane. An excess of heptane was then added, and the mixture was stored one day in the freezer. A solid was formed and filtrated. This step was repeated twice. (18.0 g, 68%) of desired product was obtained. $^1$H NMR (400 MHz, $CDCl_3$, 25 °C): δ 8.16 (s, 2H), 3.76 (s, 3H), 1.52 (s, 18H).

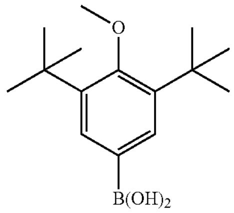 [SMILES: COc1c(C(C)(C)C)cc(B(O)O)cc1C(C)(C)C]

3,5-Di-tert-butyl-4-methoxyphenyl-1-indanone: $Pd(OAc)_2$ (0.13 g, 3% mol) and RuPhos (0.53 g, 6% mol) were added under Ar flush to a well-stirred mixture of 4-bromo-6-(tert-butyl)-5-methoxy-2-methyl-1-indanone (purified previously by column chromatography) (5.9 g, 0.019 mol), 3,5-di-tert-butyl-4-methoxyphenyl)boronic acid (8.0 g, 0.03 mol), $K_3PO_4$ (12.0 g, 0.057 mol) in THF (72 mL) and water (14 mL). The reaction mixture was refluxed overnight. Then the reaction mixture was poured into water (100 mL) and extracted with $CH_2Cl_2$ (3×100 mL). The combined organic phases were washed with water (200 mL) and an aqueous solution of $Na_2CO_3$ (2 M, 200 mL) dried over $MgSO_4$ and evaporated under vacuum. Then a concentrated solution of the crude product in dichloromethane was prepared, from which the desired product was precipitated as a white solid by adding an excess of hexane (6.0 g, 70%). $^1$H NMR (300 MHz, $CDCl_3$, 25 °C): δ 7.73 (s, 1H, ind-ArH), 7.27 (s, 2H, Ar—H), 3.75 (d, J=4.8, 3H, 4-(OMe)-Ph), 3.25 (s, 3H, OMe-ind), 3.18 (dd, J=17.4, 7.8, 1H, 2H-ind), 2.76-2.37 (m, 2H, 3H-ind), 1.44 (d, J=10.1, 29H, tBu), 1.27 (d, J=7.4, 3H, ind-$CH_3$).

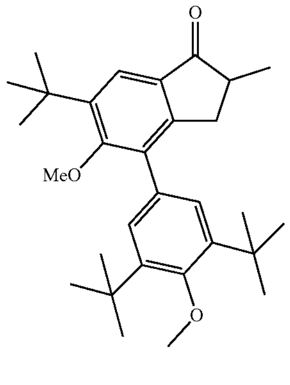 [SMILES: COc1c(C(C)(C)C)cc(-c2c3c(cc(C(C)(C)C)c2OC)C(=O)C(C)C3)cc1C(C)(C)C]

3,5-Di-tert-butyl-4-methoxyphenyl-1-indene: 3,5-Di-tert-butyl-4-methoxyphenyl-1-indanone was dissolved in THF (100 mL) and added dropwise at 0 °C to a mixture of $LiAlH_4$ (0.25 g, 6.7 mol) in THF (50 mL). After 1 hour of stirring, water was slowly added and then 5% w/v aqueous HCl (20 mL) was added. The organic phase was separated, washed with an aqueous solution of $Na_2CO_3$ (5% w/w, 100 mL), dried over $MgSO_4$ and evaporated. The residue was dissolved in toluene (80 mL), p-TSA (0.23 g, 9% mol) was added and the resulting mixture was refluxed for 30 min, cooled, washed with water, dried over $MgSO_4$ and evaporated to obtain a white crystalline solid (5.2 g, 89%). $^1H$ NMR (400 MHz, $CDCl_3$, 25 °C): δ 7.37 (s, 2H), 7.21 (s, 1H), 6.45 (q, J=1.5, 1H, 1H-ind), 3.74 (s, 3H, —$OCH_3$), 2.10-2.07 (m, 3H C—$CH_3$), 1.45 (d, J=7.2, 28H, tBu).

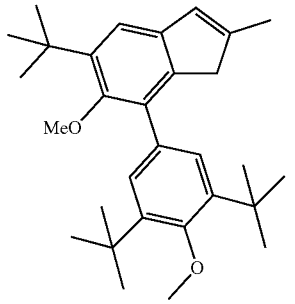 [SMILES: COc1c(C(C)(C)C)cc(-c2c3c(cc(C(C)(C)C)c2OC)C=C(C)C3)cc1C(C)(C)C]

(1,2,3,4-Tetramethyl-1,3-cyclopentadienyl)-[2-methyl-4-(3,5-di-tbutyl-4-methoxy)-6-tert-butyl-indenyl]-dimethylsilane (proligand C1[di-tBu, OMe)-Ph]): The same experimental procedure than that used for the previous synthesized ligands was followed starting from 3,5-di-tert-butyl-4-methoxyphenyl-1-indene (0.54 g, 0.00012 mmol). A yellow viscous oil was obtained, which was used on the next step without further purification (0.85 g, 98%). $^1H$ NMR (400 MHz, $CDCl_3$, 25 °C): δ 7.35 (d, J=9.4, 3H), 6.46 (s, 1H), 3.74 (d, J=3.0, 5H), 3.56 (s, 1H), 3.18 (s, 4H), 2.17 (d, J=1.3, 3H), 2.06-1.93 (m, 9H), 1.84 (td, J=7.4, 4.6, 11H), 1.44 (d, J=11.0, 34H), 0.07 (s, 1H), −0.06 (s, 2H), −0.23 (d, J=4.7, 6H).

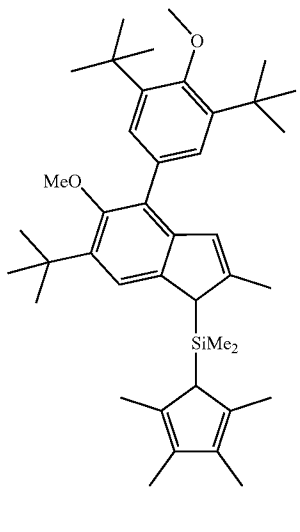

Cata 2: C1[(di-tBu, OMe)-Ph]-$ZrCl_2$ (1,2,3,4-Tetramethyl-1,3-cyclopentadienyl))-[2-methyl-4-(3,5-di-tbutyl-4-methoxy)-6-tert-butyl-indenyl]-dimethylsilane-dichlorozirconium-(IV): Using a procedure similar to that described above for other metallocene complexes, complex C1[(ditBu, OMe)-Ph]-Zr was synthesized from proligand C1[$(tBu)_2$, OMe-Ph] (0.80 g, 1.31 mmol) and isolated as a yellow microcrystalline powder (0.32 g, 30%). $^1H$ NMR (400 MHz, $CDCl_3$, 25 °C): δ 7.41 (s, 3H), 6.67 (s, 1H, H of Cp ring), 3.73 (s, 3H, ind-$OCH_3$), 3.32 (s, 3H, 4-(OMe)-Ph), 2.22 (s, 3H, C—$CH_3$), 2.04 (d, J=17.9, 6H, Cp-$CH_3$), 1.91 (d, J=12.4, 6H, Cp-$CH_3$), 1.43 (s, 21H, tBu), 1.36 (s, 9H, tBu), 1.19 (s, 3H, Si—$CH_3$), 1.07 (s, 3H, Si—$CH_3$). $^{13}C$ NMR (101 MHz, $CDCl_3$, 25 °C): δ 159.47, 158.61, 143.37, 137.35, 135.89, 135.00, 134.72, 131.19, 127.31, 126.97, 126.75, 121.91, 120.73, 120.13, 93.80, 82.45, 64.44, 62.22, 35.87, 32.47, 32.05, 30.51, 22.86, 18.34, 16.10, 15.65, 14.28, 12.66, 12.35, 3.25, 3.14. piASAP calculated for $C_{41}H_{58}Cl_2O_2SiZr$ 770.2625, found m/z 772.2628.

Cata 2

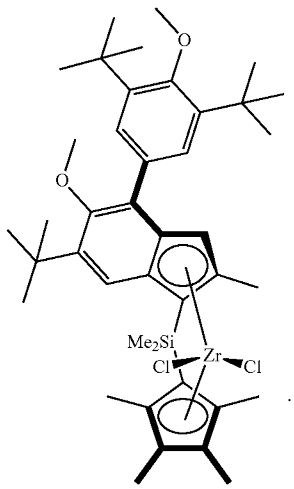

.

Reference 1 rac-Cyclohexyl(methyl)silanediylbis[2-methyl-4-(4'-tert-butylphenyl)indenyl]zirconium dichloride (Ref 1) was purchased from SPCI (south pacific chemical industries) (CAS 888227-55-2).

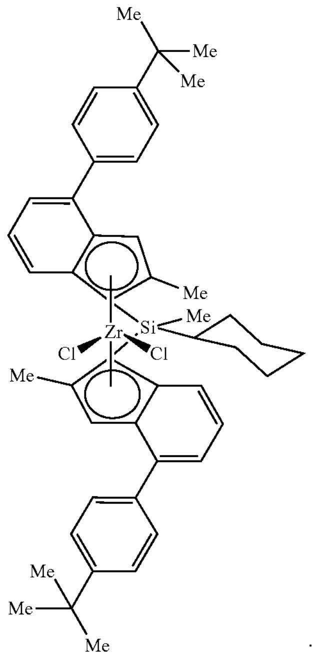

Ref 1

B. Heterogenous Polymerization of Propylene

All the catalysts have been supported in ACM methodology, using Radley apparatus, as described below:

20.011 g of dry silica (TS-F202) was suspended in 200 mL of dry toluene and the stirring was started. 38 mL of MAO (30 wt %) were added dropwise, aiming at deposition of Al of 16 wt %. An additional 87 mL of dry toluene were added, and the mixture was heated at 110 C for 4 hours. The mixture was then filtered and the solid was washed 3 times with both dry toluene and dry pentane and then dried. The metallocene (around 10 mg, in order to reach 1.25 wt % of supported metallocene) was dissolved in 5 mL of dry toluene. 8 g of silica/MAO (prepared as described above) was added and 5 ml of dry toluene was used to wash the glassware and added to the mixture. The mixture was stirred at room temperature for 3 hours and then was then filtered. The solid was washed 3 times with dry toluene and 3 times with dry pentane and then dried under vacuum. The supported catalyst was then dispersed in of dry oil (Finavestan A 360 B) in order to have a solid content of around 20 wt %.

The samples were analyzed for zirconium and aluminum content (% wt) using ICP-AES spectrometer. The ICP-AES analyses of supported catalysts are shown in Table 3.

TABLE 3
| | Ref 1 | Comp 2C | Cata 1 | Comp 1C | Cata 2 |
|---|---|---|---|---|---|
| Structure | 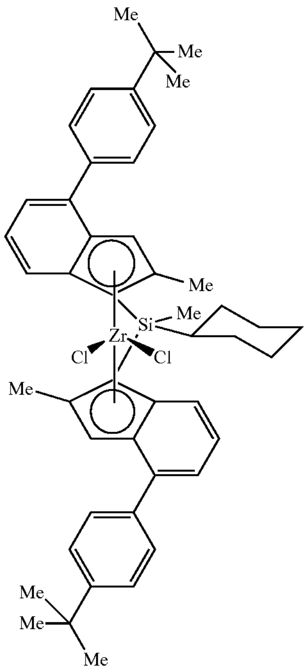 | 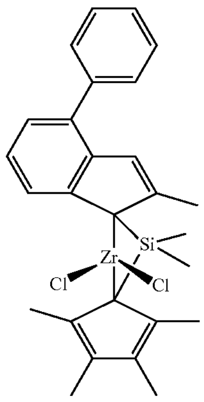 | 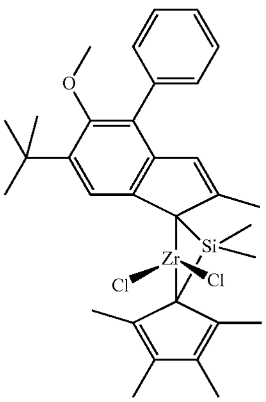 | 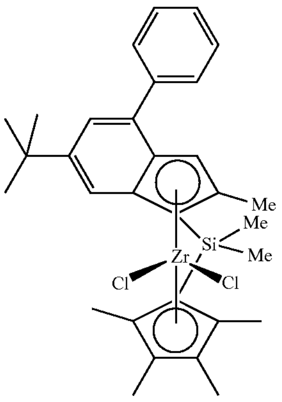 | 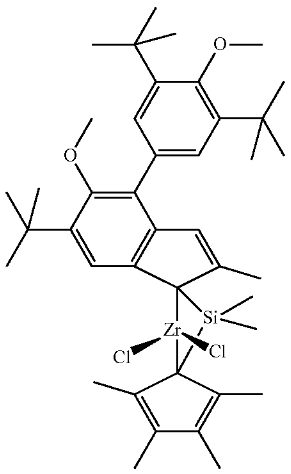 |
| Catalyst | Ref 1 | Comp 2C | Cata 1 | Comp 1C | Cata 2 |
| Zr (ppm) | 1300 | 1821 | 1652 | 1746 | 1250 |
| Al (%) | 14 | 14 | 14 | 14 | 15 |

Homo-Polymerization PPH.

The 8 liters reactor was heated at 130 °C and flushed with $N_2$ prior to being used. The reactor was then flushed with 1 L of propylene and cooled to 40 °C. Unless otherwise stated, the reaction conditions were the ones listed in Table 4. Subsequently, 3 L of propylene were pushed in the reactor together with the required amount of $H_2$. Stirring was started and once the reactor was stabilized, a mixture of 1 mL of TIBAL, the supported catalyst and the co-catalyst was injected in the reactor together with 1.5 L of propylene. The reactor was then ramped to 70 °C and once the temperature was reached, it was left to react for 1 h. The reactor was then vented, and the polymer was left under a light stream of $N_2$ to dry. The polymer was then collected and left to dry even further for 2 hours.

TABLE 4

| | |
|---|---|
| $H_2$ | 0.5 NL |
| Propylene ($C_3$) | 4.5 L |
| Temperature | 70 °C |
| Time | 1 hour |

Polymerization results are shown in Table 5.

TABLE 5

| Catalyst composition | Cata introd. (mg) | % conv. | Weight (g) | Activity (g/g/h) | Activity (kg/mmol/h) | $MI_2$ g/10 min | XS (% wt) |
|---|---|---|---|---|---|---|---|
| TS-F202/MAO/Ref 1 | 90 | 40.0 | 990 | 11000 | 772 | 6.7 | 0.3 |
| TS-F202/MAO/Comp 2C | 120 | 7.4 | 182 | 1517 | 76 | 35 | 1.5 |
| TS-F202/MAO/Cata 1 | 120 | 16.9 | 418 | 3483 | 192 | 79 | 0.3 |
| TS-F202/MAO/Comp 1C | 120 | 10.6 | 262 | 2183 | 114 | 144.6 | 0.6 |
| TS-F202/MAO/Cata 2 | 120 | 42.2 | 1045 | 8708 | 636 | 65.2 | 0.1 |

Activity of the comparative examples is quite low. When a methoxy moiety is grafted on the indenyl, the activity is enhanced, especially when a second methoxy on the phenyl ring in position 4 is added. This last metallocene is almost as active as Ref 1.

Low xylene soluble values have been measured.

DSC and NMR analysis are shown in Table 6.

TABLE 6

| Catalyst composition | $T_m$ (°C) | $T_c$ (°C) | [mmmm] (%) | [2,1-regio] (%) |
|---|---|---|---|---|
| TS-F202/MAO/Ref 1 | 151 | 103. | 98.1 | 0.8 |
| TS-F202/MAO/Comp 2C | 147.8 | 109 | 91.9 | 0.2 |
| TS-F202/MAO/Cata 1 | 150.7 | 107 | 95.4 | 0.3 |
| TS-F202/MAO/Comp 1C | 144.5 | 104 | 91.7 | 0.3 |
| TS-F202/MAO/Cata 2 | 155.2 | 109 | 96.6 | 0.2 |

A low content of regio-defects (in comparison with the bis-indenyl Ref 1) can be seen. All these different values of defects along the chain have an impact of the melting and crystallization temperatures.

The termination information and NMR results are shown in Table 7.

TABLE 7

| Catalyst | Ref 1 | Comp 2C | Cata 1 | Comp 1C | Cata 2 |
|---|---|---|---|---|---|
| 1,2 C3- | 99.09 | 99.63 | 99.53 | 99.42 | 99.63 |
| 2,1 C3- | 0.81 | 0.16 | 0.30 | 0.33 | 0.18 |
| 1,3 C3- | 0.03 | 0.00 | 0.00 | traces | 0.00 |

Random Co-Polymerization PPR.

Polymerizations took place in presence of 15 g of ethylene, 0.5 NL of hydrogen, TIBAL as scavenger, at 70 °C and for 30 min, in an 8 liters reactor. Unless otherwise stated, the reaction conditions were the ones listed in Table 8. The reactor was then vented, and the polymer was left under a light stream of $N_2$ to dry. The polymer was then collected and left to dry even further for 2 hours.

TABLE 8

| | |
|---|---|
| $H_2$ | 0.5 NL |
| Propylene ($C_3$) | 4.5 L |
| Ethylene ($C_2$) | 15 g |
| Temperature | 70 °C |
| Time | 0.5 hours |

Results of the polymerization are detailed in Table 9.

TABLE 9

| Catalyst composition | Cata introd. (mg) | % conv. | Weight (g) | Activity (g/g · h) | Activity (kg/mmol · h) | $MI_2$ g/10 min | % $C_2$ NMR | $mC_2$ used (g) | % $C_2$ consumed |
|---|---|---|---|---|---|---|---|---|---|
| TS-F202/MAO/Ref 1 | 90 | 37.8 | 936 | 20800 | 730 | 12 | 0.7 | 6.6 | 43.7 |
| TS-F202/MAO/Comp 2C | 120 | 8.3 | 205 | 3420 | 86 | 35 | 2.3 | 4.7 | 31.4 |
| TS-F202/MAO/Cata 1 | 120 | 27.5 | 680 | 11330 | 313 | 51 | 1.6 | 10.9 | 72.5 |
| TS-F202/MAO/Comp 1C | 120 | 17.6 | 435 | 7250 | 189 | 74.8 | 2.3 | 10.0 | 66.7 |
| TS-F202/MAO/Cata 2 | 120 | 26.7 | 660 | 11000 | 401 | 49.7 | 1.4 | 9.2 | 61.6 |

It can be seen that ethylene conversion was high.

The NMR, GPC and DSC determination results are shown in Table 10.

TABLE 10

| Catalyst composition | Cata introd. (mg) | $MI_2$ g/10 min | $T_m$ (°C) | $T_c$ (°C) | $M_n$ (kg/mol) | $M_w$ (kg/mol) | $M_z$ (kg/mol) | $M_w/M_n$ | $M_z/M_w$ | C2 after 2,1 C3 (% vrs Total C2) |
|---|---|---|---|---|---|---|---|---|---|---|
| TS-F202/MAO/Ref 1 | 90 | 12 | 147 | 99 | 124.5 | 413.2 | 898.4 | 3.3 | 2.2 | 14.6 |
| TS-F202/MAO/Comp 2C | 120 | 35 | 134 | 93 | 54.5 | 154.7 | 359.0 | 2.8 | 2.3 | 0.7 |
| TS-F202/MAO/Cata 1 | 120 | 51 | 139 | 97 | 57.5 | 142.1 | 286.7 | 2.5 | 2.0 | 1.6 |
| TS-F202/MAO/Comp 1C | 120 | 74.8 | 132 | 91 | 48.6 | 120.1 | 291.2 | 2.5 | 2.4 | 1.3 |
| TS-F202/MAO/Cata 2 | 120 | 49.7 | 143 | 98 | 57.7 | 142.6 | 279.2 | 2.5 | 2.0 | 1.1 |

GPC results displayed in the Table 10 are in line with the MFI analyses. Lower melting and crystallization temperatures are also noticeable for new metallocene-based PPR in comparison with Ref 1. This is due to a higher ethylene incorporation and a lower melting and crystallization temperatures in homo-polymerization (see above). Higher melting and crystallization temperatures are also noticeable in comparison with polymerization with comparative catalysts Comp 1C and 2C.

TABLE 11

| Cata. | [Zr] [μmol · $L^{-1}$] | [Al]/[Zr] | $T_{polym}$ [°C] | $m_{iPP}$ [g] | Productivity [kg · $mol^{-1}$ · $h^{-1}$] | $T_m{}^c$ [°C.] | $T_c{}^c$ [°C.] | $M_n$ [x$10^3$] | $M_w/M_n$ | $[m]^4$ | 2,1 insert. [%] |
|---|---|---|---|---|---|---|---|---|---|---|---|
| Comp 2C | 2.0 | 5000 | 60 | 18.3 | 122 000 | 149 | 112 | 25.2 | 2.3 | 91.8 | 0.1 |
| | | | 60 | 28.6 | 190 700 | 148 | 113 | | | | |
| Comp 1C | 2.0 | 5000 | 60 | 2.53 | 17 000 | 145 | 108 | 26.6 | 2.5 | 90.5 | 0.3 |
| | | | 60 | 3.0 | 13 300 | 145 | 107 | | | | |
| Cata 1 | 2.0 | 5000 | 60 | 7.58 | 50 500 | 152 | 114 | 29.2 | 2.2 | 94.3 | 0.2 |
| | | | 60 | 6.22 | 41 500 | 152 | 115 | | | | |
| Cata 2 | 2.0 | 5000 | 60 | 16.2 | 109 000 | 157 | 118 | 41.9 | 2.2 | 96.5 | 0.2 |
| | | | 60 | 15.5 | 103 000 | 153 | 121 | | | | |

Compared to comparative catalysts 1C and 2C, using an indenyl bearing an —OR group such as a methoxy group, allowed an increase of the activity. Higher stereo-defects and lower regio-defects have been seen compared to the Ref 1 catalyst.

C. Homogenous Polymerization of Propylene

Polymerization was performed in a 300 mL-high-pressure glass reactor equipped with a mechanical stirrer (Pelton turbine) and externally heated with a double mantle with a circulating water bath. The reactor was charged with toluene (150 mL) and MAO (5000 equiv. of a PMAO 13 wt. % Al in toluene). After 30 min, propylene (5 bar, Air liquid, 99.99%) was introduced, subsequently the propylene pressure was decreased to 1 bar and a solution of the catalyst precursor in toluene (2.0 μmol, depending on catalyst MW and concentration of catalyst) was added by syringe. The propylene pressure was immediately increased to 5 bar (kept constant with a back regulator) and the solution was stirred for 30 min. The temperature inside the reactor was monitored using a thermocouple. The polymerization was stopped by venting the vessel and quenching with a 10% solution of aqueous HCl in MeOH. The polymer was precipitated in methanol (500 mL) with 10% c. HCl solution. The polymer was collected by filtration, washed with methanol (200 mL) and dried under vacuum (60 °C, 3 h).

The results of the polymerization are shown in Table 11.

D. Heterogenous Polymerization of Ethylene

Polymerization reactions were performed in a 132 ml autoclave with an agitator, a temperature controller and inlets for feeding of ethylene and hydrogen. The reactor was dried at 110 °C with nitrogen for one hour and then cooled to 40 °C.

All polymerizations were performed under the conditions depicted in table 12 (unless otherwise stated). The reactor was loaded with 75 ml of isobutane, 1.6 ml of 1-hexene and pressurized with 23.8 bar of ethylene with 800 ppm of hydrogen. Catalyst (3.5 mg) and co-catalyst were added. Polymerization started upon catalyst suspension injection, was performed at 85 °C and was stopped after 60 minutes by reactor depressurization. Reactor was flushed with nitrogen prior opening.

TABLE 12

| Conditions | Unit | Reactor |
|---|---|---|
| Isobutane (iC4) | L | 0.075 |
| Triisobutylaluminum (TIBAL) | ppm | 100 |
| Hydrogen | ppm | 800 |
| Temperature | °C | 85 |
| Ethylene pressure | bar | 23.8 |

Polymerization results are shown in Table 13.

TABLE 13

| | Catalyst | Comp 2C | Cata 1 | Comp 1C | Ref 1 | Cata 2 |
|---|---|---|---|---|---|---|
| Activity | (g/g/h) | 1000 | 1022 | 714 | 1498 | 847 |
| Activity | (kg/mmol/h) | 50 | 56 | 37 | 105 | 62 |
| $MI_2$ | (g/10 min) | 0.79 | | | | 1.35 |
| HLMI | (g/10 min) | | | | 1.69 | |
| $M_w$ | (g/mol) | 106064 | 119851 | 83679 | 231534 | 88979 |
| $M_w/M_n$ | | 4 | 3.8 | 3.5 | 5.7 | 3.4 |
| $T_m$ | (°C) | 133 | 134 | 132 | 133 | 133 |

The invention claimed is:

1. A catalyst of Formula (I)

(I)

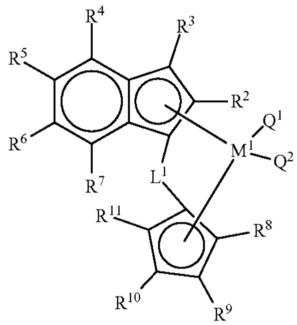

wherein $R^2$, $R^3$, $R^6$, $R^7$, are each independently selected from hydrogen or from the group consisting of alkyl, alkenyl, cycloalkyl, cycloalkenyl, cycloalkenylalkyl, aryl, —$OR^{15}$, alkylaryl, arylalkyl, halogen, $Si(R^{12})_3$, and heteroalkyl; wherein each of said group can be unsubstituted or substituted with one or more substituents $Z^1$; wherein $Z^1$ is selected from —$OR^{16}$, alkyl, and alkenyl; wherein $R^{15}$, $R^{16}$ are each independently selected from the group consisting of alkyl, arylalkyl, alkylaryl and aryl;

and wherein $R^4$ is aryl unsubstituted or substituted with one or more $Z^1$, and $R^5$ is —$OR^{15}$;

$R^8$, $R^9$, $R^{10}$, $R^{11}$, are each independently selected from the group consisting of hydrogen, alkyl, alkenyl, cycloalkyl, cycloalkenyl, cycloalkenylalkyl, aryl, alkoxy, alkylaryl, arylalkyl, halogen, $Si(R^{12})_3$, and heteroalkyl;

$L^1$ is $SiR^{13}R^{14}$, —$[CR^{13}R^{14}]_h$—, $GeR^{13}R^{14}$, or $BR^{13}$; wherein h is an integer selected from 1, 2, or 3; each of $R^{13}$, and $R^{14}$ are independently selected from the group consisting of hydrogen, alkyl, alkenyl, cycloalkyl, cycloalkenyl, cycloalkenylalkyl, aryl, aminoalkyl, and arylalkyl; or $R^{13}$ and $R^{14}$ together with the atom to which they are attached form a cycloalkyl, cycloalkenyl or heterocyclyl;

$M^1$ is a transition metal selected from the group consisting of zirconium, titanium, hafnium, and vanadium;

$Q^1$ and $Q^2$ are each independently selected from the group consisting of halogen, alkyl, —$N(R^{17})_2$, alkoxy, cycloalkoxy, aryloxy, arylalkyloxy, cycloalkyl, aryl, alkylaryl, aralkyl, and heteroalkyl; wherein each $R^{17}$ is independently selected from the group consisting of hydrogen, alkyl, $Si(R^{12})_3$, cycloalkyl, aryl, alkylaryl, aralkyl, and heteroalkyl; and each $R^{12}$ is independently hydrogen, alkyl, or alkenyl.

2. The catalyst according to claim 1, wherein $R^2$, $R^3$, $R^6$, $R^7$, are each independently selected from hydrogen or from the group consisting of $C_{1-8}$ alkyl, $C_{2-8}$ alkenyl, $C_{3-8}$ cycloalkyl, $C_{5-8}$ cycloalkenyl, $C_{5-8}$ cycloalkenyl-$C_{1-8}$ alkyl, $C_{6-10}$ aryl, —$OR^{15}$, $C_{1-8}$ alkyl-$C_{6-10}$ aryl, $C_{6-10}$ aryl-$C_{1-8}$ alkyl, halogen, $Si(R^{12})_3$, and hetero$C_{1-8}$ alkyl; wherein each of said group can be unsubstituted or substituted with one or more substituents $Z^1$; wherein $Z^1$ is selected from —$OR^{16}$, $C_{1-8}$ alkyl, and $C_{2-8}$ alkenyl; each $R^{12}$ is independently hydrogen, $C_{1-8}$ alkyl, or $C_{2-8}$ alkenyl; wherein $R^{15}$, $R^{16}$ are each independently selected from the group consisting of $C_{1-8}$ alkyl, $C_{6-10}$ aryl-$C_{1-8}$ alkyl, $C_{7-8}$ alkyl-$C_{6-10}$ aryl and $C_{6-10}$ aryl.

3. The catalyst according to claim 1, wherein $R^8$, $R^9$, $R^{10}$, $R^{11}$, are each independently selected from the group consisting of hydrogen, $C_{1-8}$ alkyl, $C_{2-8}$ alkenyl, $C_{3-8}$ cycloalkyl, $C_{5-8}$ cycloalkenyl, $C_{5-8}$ cycloalkenyl-$C_{1-8}$ alkyl, $C_{6-10}$ aryl, $C_{1-8}$ alkoxy, $C_{1-8}$ alkyl-$C_{6-10}$ aryl, $C_{6-10}$ aryl-$C_{1-8}$ alkyl, halogen, $Si(R^{12})_3$, and hetero$C_{1-8}$ alkyl; and each $R^{12}$ is independently hydrogen, $C_{1-8}$ alkyl, or $C_{2-8}$ alkenyl.

4. The catalyst according to claim 1, wherein $L^1$ is $SiR^{13}R^{14}$, —$[CR^{13}R^{14}]_h$—, $GeR^{13}R^{14}$, or $BR^{13}$; wherein h is an integer selected from 1, 2, or 3; each of $R^{13}$, and $R^{14}$ are independently selected from the group consisting of hydrogen, $C_{1-8}$ alkyl, $C_{2-8}$ alkenyl, $C_{3-8}$ cycloalkyl, $C_{5-8}$ cycloalkenyl, $C_{5-8}$ cycloalkenyl-$C_{1-8}$ alkyl, $C_{6-10}$ aryl, amino$C_{1-8}$ alkyl, and $C_{6-10}$ aryl-$C_{1-8}$ alkyl; or $R^{13}$ and $R^{14}$ together with the atom to which they are attached form a $C_{3-8}$ cycloalkyl, $C_{5-8}$ cycloalkenyl or 3-8 membered heterocyclyl.

5. The catalyst according to claim 1, wherein $M^1$ is a transition metal selected from the group consisting of zirconium, titanium, hafnium, and vanadium; and $Q^1$ and $Q^2$ are each independently selected from the group consisting of halogen, $C_{1-8}$ alkyl, —$N(R^{17})_2$, $C_{1-8}$ alkoxy, $C_{3-8}$ cycloalkoxy, $C_{6-10}$ aryl-$C_{1-8}$ alkyloxy, $C_{3-8}$ cycloalkyl, $C_{6-10}$ aryl, $C_{6-10}$ aryloxy, $C_{1-8}$ alkyl-$C_{6-10}$ aryl, $C_{6-10}$ aryl-$C_{1-8}$ alkyl, and hetero$C_{1-8}$ alkyl; wherein each $R^{17}$ is independently selected from the group consisting of hydrogen, $C_{1-8}$ alkyl, $Si(R^{12})_3$, $C_{3-8}$ cycloalkyl, $C_{6-10}$ aryl, $C_{1-8}$ alkyl-$C_{6-10}$ aryl, $C_{6-10}$ aryl-$C_{1-8}$ alkyl, and hetero$C_{1-8}$ alkyl; preferably each $R^{17}$ is independently hydrogen or $C_{1-8}$ alkyl.

6. The catalyst according to claim 1, having formula (II)

(II)

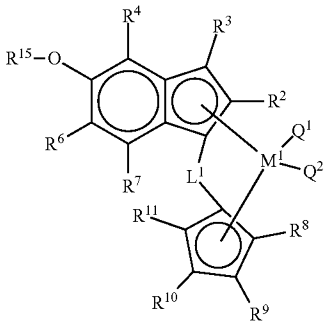

wherein $R^2$, $R^3$, $R^4$, $R^{15}$, $R^6$, $R^7$, $R^8$, $R^9$, $R^{10}$, $R^{11}$, $L^1$, $M^1$, $Q^1$, $Q^2$ have the same meaning as in claim 1.

7. The catalyst according to claim 1, having formula (III) or (IV), (III)

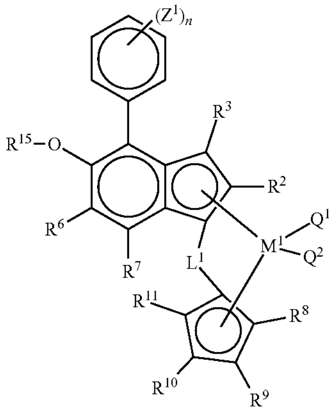

(IV)

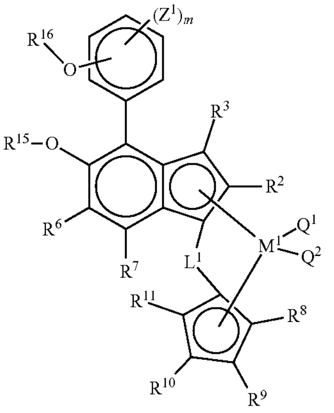

wherein n is an integer selected from 0, 1, 2, 3 or 4; m is an integer selected from 0, 1, 2, or 3; and wherein $R^2$, $R^3$, $R^{15}$, $R^{16}$, $R^6$, $R^7$, $R^8$, $R^9$, $R^{10}$, $R^{11}$, $L^1$, $Z^1$, $M^1$, $Q^1$, $Q^2$ have the same meaning as in claim 1.

8. The catalyst according to claim 1, having formula (V) or (VI), (V)

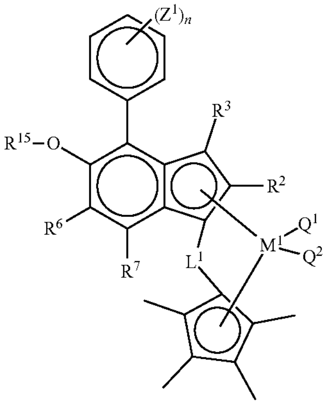

(VI)

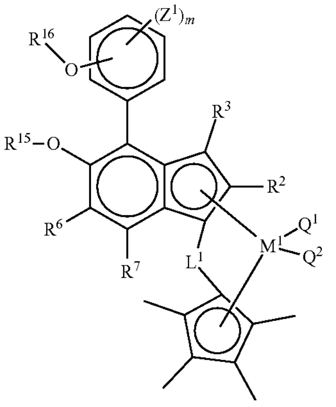

wherein n is an integer selected from 0, 1, 2, 3 or 4, m is an integer selected from 0, 1, 2, or 3; and wherein $R^2$, $R^3$, $R^{15}$, $R^{16}$, $R^6$, $R^7$, $L^1$, $Z^1$, $M^1$, $Q^1$, $Q^2$ have the same meaning as in claim 1.

9. The catalyst according to claim 1, wherein $L^1$ is $SiR^{13}R^{14}$, or —$[CR^{13}R^{14}]$—, and $R^{13}$, $R^{14}$ have the same meaning as that defined in claim 1.

10. The catalyst according to claim 1, having formula (VII) or (VIII), (VII)

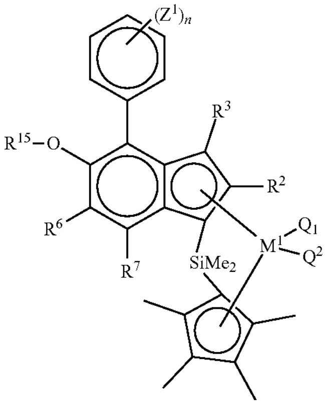

-continued (VIII)

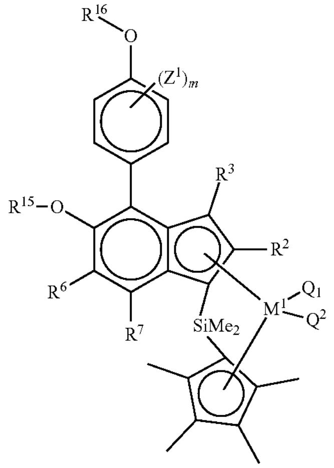

wherein n is an integer selected from 0, 1, 2, 3 or 4, m is an integer selected from 0, 1, 2, or 3; and wherein $R^2$, $R^3$, $R^{15}$, $R^{16}$, $R^6$, $R^7$, $Z^1$, $M^1$, $Q^1$, $Q^2$ have the same meaning as in claim 1.

11. A supported catalyst comprising a catalyst according to claim 1, and a support.

12. A catalyst composition comprising:

at least one catalyst according to claim 1;

an optional activator; an optional support; and an optional co-catalyst.

13. The catalyst composition according to claim 12, wherein the catalyst composition comprises an activator.

14. The catalyst composition according to claim 12, comprising an alumoxane activator; and a titanated silica or silica solid support; and an optional co-catalyst.

15. An olefin polymerization process, the process comprising: contacting a catalyst composition according to claim 12, with an olefin monomer, optionally hydrogen, and optionally one or more olefin comonomers; and polymerizing the monomer, and the optionally one or more olefin comonomers, in the presence of the at least one catalyst composition, and optional hydrogen, thereby obtaining an olefin polymer.

16. An olefin polymerization process, the process comprising: contacting a catalyst according to claim 1, with an olefin monomer, optionally hydrogen, and optionally one or more olefin comonomers; and polymerizing the monomer, and the optionally one or more olefin comonomers, in the presence of the at least one catalyst-composition, and optional hydrogen, thereby obtaining an olefin polymer.

* * * * *